US012656732B2

(12) United States Patent
Matsuda et al.

(10) Patent No.: US 12,656,732 B2
(45) Date of Patent: Jun. 16, 2026

(54) IMAGE FORMING APPARATUS AND CARTRIDGE

(71) Applicant: CANON KABUSHIKI KAISHA, Tokyo (JP)

(72) Inventors: Kenji Matsuda, Shizuoka (JP); Ken Yokoyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/889,161

(22) Filed: Sep. 18, 2024

(65) Prior Publication Data

US 2025/0103001 A1 Mar. 27, 2025

(30) Foreign Application Priority Data

Sep. 22, 2023 (JP) ................................ 2023-159239

(51) Int. Cl.
*G03G 21/18* (2006.01)

(52) U.S. Cl.
CPC ..... *G03G 21/1842* (2013.01); *G03G 21/1814* (2013.01); *G03G 21/1821* (2013.01); *G03G 21/1867* (2013.01); *G03G 21/1885* (2013.01)

(58) Field of Classification Search
CPC ........... G03G 21/1842; G03G 21/1814; G03G 21/1821; G03G 21/1867; G03G 21/1885; G03G 21/1652; G03G 21/181
See application file for complete search history.

(56) References Cited

U.S. PATENT DOCUMENTS

| | | | | |
|---|---|---|---|---|
| 2016/0231695 | A1* | 8/2016 | Taguchi | G03G 21/181 |
| 2019/0227482 | A1* | 7/2019 | Koguchi | G03G 21/1814 |
| 2021/0200147 | A1* | 7/2021 | Komatsu | G03G 21/1814 |
| 2022/0283537 | A1* | 9/2022 | Fukamachi | G03G 21/1885 |

FOREIGN PATENT DOCUMENTS

| | | | |
|---|---|---|---|
| JP | 2016145853 | A | 8/2016 |
| JP | 2022134752 | A | 9/2022 |
| JP | 2023065193 | A | 5/2023 |
| JP | 2023111307 | A | 8/2023 |

* cited by examiner

*Primary Examiner* — Sandra Brase
(74) *Attorney, Agent, or Firm* — Canon U.S.A., Inc. IP Division

(57) ABSTRACT

An image forming apparatus includes an apparatus main body, a first unit dismountable from the apparatus main body, a second unit dismountable from the first unit, and a protective member. The first unit includes a photosensitive member, a transfer unit, and a first unit memory section. The second unit includes a development roller, a storage section that stores a developer, and a second unit memory section. The apparatus main body includes a first main body contact that is electrically connectable to the first unit memory section and a second main body contact that is electrically connectable to the second unit memory section. When the image forming apparatus is packed, the first unit and the second unit are mounted to the apparatus main body with the second unit mounted to the first unit and with the protective member mounted to the first unit and the second unit.

5 Claims, 24 Drawing Sheets

IMAGE FORMING APPARATUS AND CARTRIDGE

BACKGROUND

Field

The present disclosure relates to an image forming apparatus for forming an image on a sheet and a cartridge.

Description of the Related Art

Image forming apparatuses each including a process cartridge that is dismountable from the main body of the apparatus have been developed. Japanese Patent Laid-Open No. 2016-145853 describes an image forming apparatus including a process cartridge that includes a photosensitive unit and a developing unit removably supported by the photosensitive unit and that is protected by a protective member during transport of the image forming apparatus.

The protective member has a spacer portion disposed between the photosensitive unit and a developing cartridge to reduce backlash of the developing unit. This prevents toner from leaking from the process cartridge even if the process cartridge is subjected to vibration or shock during transport of the image forming apparatus.

SUMMARY

The present disclosure provides an image forming apparatus and a cartridge that further improve the image forming technology.

According to some embodiments, an image forming apparatus includes an apparatus main body, a first unit dismountable from the apparatus main body, a second unit dismountable from the first unit, and a protective member dismountably supported by the first unit and the second unit, wherein the first unit includes a photosensitive member configured to bear an electrostatic latent image, a transfer unit configured to transfer a toner image formed on the photosensitive member, and a first unit memory section configured to store information regarding the first unit, wherein the second unit includes a development roller configured to develop the electrostatic latent image borne by the photosensitive member into a toner image, a storage section configured to store a developer, and a second unit memory section configured to store information regarding the second unit, wherein the apparatus main body includes a first main body contact that is electrically connectable to the first unit memory section and a second main body contact that is electrically connectable to the second unit memory section, and wherein when the image forming apparatus is packed, the first unit and the second unit are mounted to the apparatus main body with the second unit mounted to the first unit and with the protective member mounted to the first unit and the second unit.

Further features of the present disclosure will become apparent from the following description of exemplary embodiments with reference to the attached drawings.

DESCRIPTION OF THE EMBODIMENTS

First Embodiment

Overall Configuration

Figure 1:
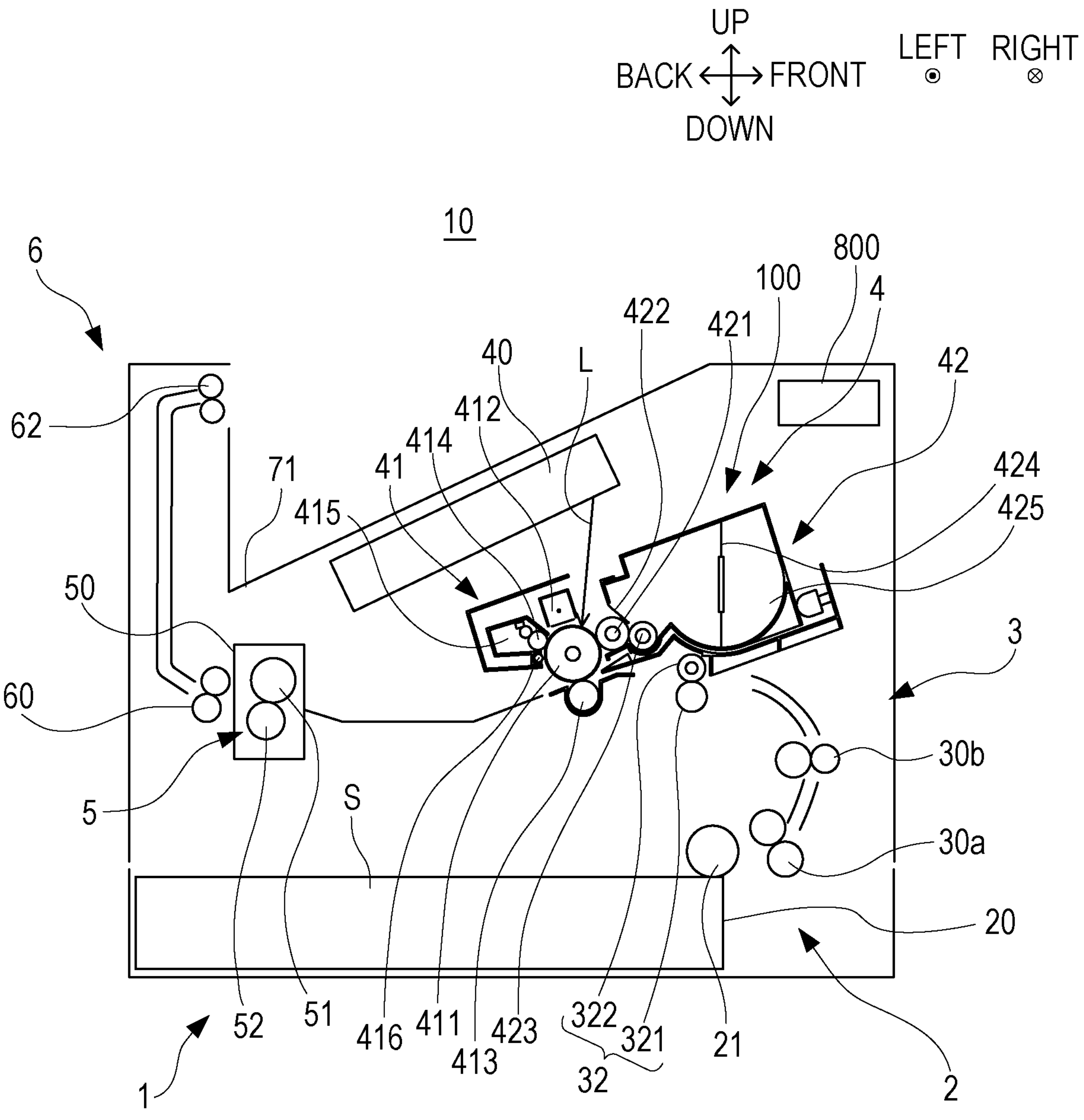
FIG. 1 is a schematic overall view of an image forming apparatus according to a first embodiment.

The first embodiment of the present disclosure will now be described. FIG. 1 is a schematic overall view of an image forming apparatus 10. The directions illustrated in FIG. 1 are defined as follows.

The upward direction in FIG. 1 is referred to as an "upward direction". The downward direction in FIG. 1 is referred to as a "downward direction". The left direction in FIG. 1 is referred to as a "backward direction". The right direction in FIG. 1 is referred to as a "frontward direction". The direction out of the plane of FIG. 1 is referred to as a "left direction", and the direction into the plane of FIG. 1 is referred to as a "right direction".

As illustrated in FIG. 1, the image forming apparatus 10 according to the present embodiment is an electrophotographic laser beam printer that forms a monochrome toner image. As used herein, the term "image forming apparatus" refers to an apparatus that forms an image on a sheet used as a recording medium on the basis of image information input or received from an external personal computer (PC) or other computing device, or read from a document, and the image forming apparatus may include a main body having an image forming function, a printer, a copying machine, a facsimile, a multifunction peripheral, other components, or combinations thereof. In addition to including the main body having an image forming function, the image forming apparatus may include connected ancillary equipment, such as an optional feeder, an image reading unit, a sheet processing unit, or other components. Even such a system in which the ancillary equipment is connected to the main body is also one type of image forming apparatus.

The image forming apparatus 10 includes an apparatus main body 1 and a process cartridge 100 that is dismountably supported by the apparatus main body 1. The image forming apparatus 10 further includes a feed unit 2, a conveying unit 3 that conveys a sheet S fed by the feed unit, and an image forming unit 4 that forms an image on the sheet S conveyed by the conveying unit 3. The image forming apparatus 10 still further includes a fixing unit 5 that fixes the image transferred on the sheet S, a discharge unit 6 that discharges the sheet S to the outside of the apparatus main body 1, and a control unit 800. Example of the sheet S include paper, such as flat paper and an envelope, a plastic film, such as an overhead projector sheet (OHP sheet), and cloth.

The feed unit 2 is disposed in a lower section of the apparatus main body 1. The feed unit 2 includes a cassette 20 that stores the sheet S and a pickup roller 21 that feeds the sheet S stored in the cassette 20. The conveying unit 3 includes conveying roller pairs 30*a* and 30*b* and a drive roller 321 of a conveying roller pair 32 (described below).

The image forming unit 4 includes the process cartridge 100 and a laser scanner 40 provided in the apparatus main body 1. The process cartridge 100 includes a drum cartridge 41 serving as a first unit and a developing cartridge 42 serving as a second unit that is dismountably supported by the drum cartridge 41. The drum cartridge 41 includes a photosensitive drum 411 that is rotatable and that bears an electrostatic latent image, a charging unit 412 that charges a surface of the photosensitive drum 411, and a transfer roller 413 that transfers a toner image formed on the photosensitive drum 411 to the sheet S. The charging unit 412 includes, for example, a corona charger and a charging roller.

The drum cartridge 41 further includes a cleaning unit 414 that cleans a residual substance adhering to the photosensitive drum 411, a collection unit 415 that collects the residual substance cleaned by the cleaning unit 414, a static elimination unit 416 that eliminates the potential of the photosensitive drum 411, and a driven roller 322. Examples of the above-described residual substance include residual transfer toner and paper powder on the photosensitive drum 411. The static elimination unit 416 eliminates the potential of the photosensitive drum 411 by, for example, irradiating the photosensitive drum 411 with light. The driven roller 322 forms the conveying roller pair 32 together with the drive roller 321 of the conveying unit 3 described above and is rotatingly driven by the drive roller 321 serving as a first conveying roller.

The developing cartridge 42 includes a development roller 421 that supplies developer to the electrostatic latent image borne by the photosensitive drum 411 and develops the electrostatic latent image into a toner image and a development blade 422 that regulates the layer thickness of the developer borne by the development roller 421. The developing cartridge 42 further includes a supply roller 423 that supplies developer to the development roller 421, a conveyance paddle 424 that conveys the developer to the supply roller 423, and a developer storage section 425 that stores the developer.

The fixing unit 5 includes a fixing frame 50 and a heat roller 51 and a pressure roller 52 that are rotatably supported by the fixing frame 50. The heat roller 51 includes a built-in heater (not illustrated), and the surface of the heat roller 51 is heated by the heat of the heater. The pressure roller 52 is pressed toward the heat roller 51 by a pressure spring (not illustrated). Instead of the heat roller 51, a heating unit that heats a seamless belt or film with a heater, such as a ceramic heater, may be employed. Alternatively, instead of the heat roller 51, a heating member having a heating layer heated by induction heating may be employed.

The discharge unit 6 includes a conveying roller pair 60 that conveys the sheet S that has passed through the fixing unit 5, a discharge roller pair 62 that discharges the sheet S conveyed by the conveying roller pair 60 to the outside of the image forming apparatus 10, and a discharge tray 71 onto which the discharged sheet S is stacked.

Image Forming Operation

The image forming operation in which the image forming apparatus 10 forms an image on the sheet S is described below.

When an image forming command is output to the image forming apparatus 10, an image forming process performed by the image forming unit 4 is started on the basis of image information input from an external computer or another device connected to the image forming apparatus 10. The laser scanner 40 emits a laser beam L toward the photosensitive drum 411 on the basis of the input image information. At this time, the photosensitive drum 411 is pre-charged by the charging unit 412, and an electrostatic latent image is formed on the photosensitive drum 411 when the laser beam L is emitted. The electrostatic latent image is then developed by the toner borne on the development roller 421 to form a monochrome toner image on the photosensitive drum 411.

In parallel with the image forming process described above, a sheet S is fed from the feed unit 2. The sheet S stored in the cassette 20 of the feed unit 2 is fed by the pickup roller 21, and the sheet S fed by the pickup roller 21 is conveyed by the conveying roller pairs 30*a* and 30*b* toward the conveying roller pair 32. The conveying roller pair 32 may have a function of correcting the skew of the sheet S.

The toner image on the photosensitive drum 411 is transferred to the sheet S that is conveyed by the conveying roller pair 32 at a predetermined conveyance timing, by an electrostatic load bias applied to the transfer roller 413 serving as a transfer unit. A residual substance remaining on the photosensitive drum 411 is cleaned by the cleaning unit 414 and is collected by the collection unit 415.

The sheet S having the toner image transferred thereonto is subjected to predetermined heat and pressure by the heat roller 51 and the pressure roller 52 in the fixing unit 5, and thus, the toner melts and solidifies (fixes to the sheet S). The sheet S that has passed through the fixing unit 5 is conveyed by the conveying roller pair 60 to the discharge roller pair 62 and is discharged by the discharge roller pair 62 onto the discharge tray 71.

According to the present embodiment, the toner image (developer image) borne on the photosensitive drum 411 is directly transferred to the sheet S (known as a direct transfer method). However, another method can be employed in which a toner image borne by the photosensitive drum 411 is transferred to an intermediate transfer member (not illustrated) and then is transferred to the sheet S (known as an indirect transfer method). The direct transfer method has the advantage of a simple configuration because the toner image is transferred directly from the photosensitive drum 411 to the sheet S. In contrast, the indirect transfer method has the advantage of reducing the damage that the photosensitive drum 411 receives from the sheet S because the sheet S is not in direct contact with the photosensitive drum 411.

Detailed Configuration of Process Cartridge

Figure 2:
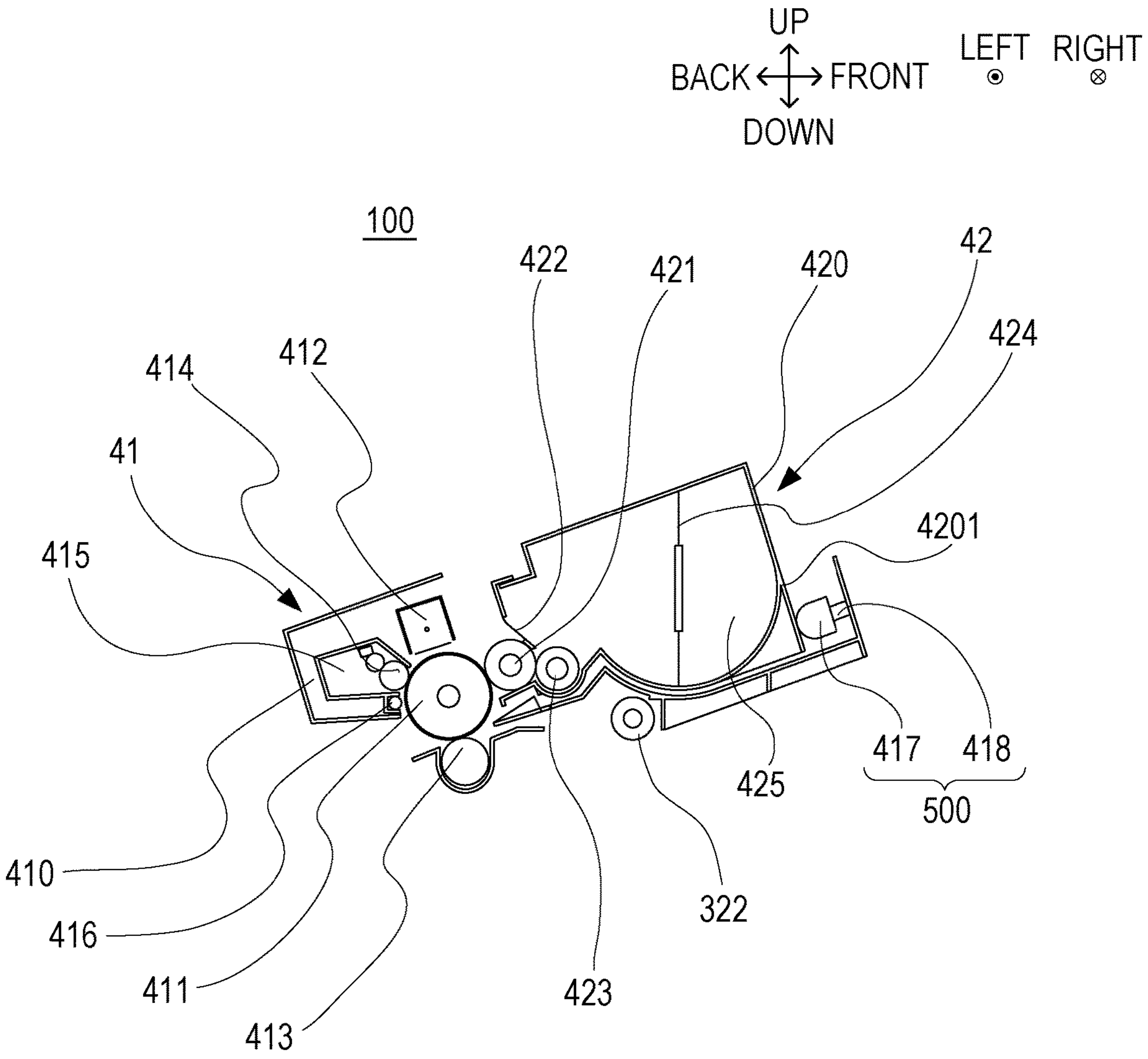
FIG. 2 is a schematic cross-sectional view of a process cartridge.

FIG. 2 is a schematic cross-sectional view of the process cartridge 100. As described above, the process cartridge 100 includes the drum cartridge 41 and the developing cartridge 42, as illustrated in FIG. 2. The drum cartridge 41 includes a drum frame 410 serving as a first housing that supports the photosensitive drum 411, the charging unit 412, the transfer roller 413, the cleaning unit 414, the collection unit 415, the static elimination unit 416, and the driven roller 322. That is, the drum cartridge 41 is a unit integrated using the drum frame 410.

When the image forming operation described above is repeatedly performed, the photosensitive drum 411 and transfer roller 413 gradually deteriorate. In addition, the collection unit 415 fills with the collected residual substance. The drum cartridge 41 is integrated with the drum frame 410, which makes it easy to replace.

The developing cartridge 42 includes a developing frame 420 serving as a second housing that supports the development roller 421, the development blade 422, the supply roller 423, and the conveyance paddle 424 and that includes the developer storage section 425 formed thereinside. That is, the developing cartridge 42 is a unit integrated using the developing frame 420.

When the image forming operation described above is repeatedly performed, the development roller 421 and the supply roller 423 gradually deteriorate. In addition, the developer stored in the developer storage section 425 is consumed. The developing cartridge 42 is integrated with the developing frame 420, which makes it easy to replace.

The drum cartridge 41 further includes a developing pressure member 417 and a developing pressure spring 418 assembled to the drum frame 410. According to the present embodiment, two pairs each consisting of the developing pressure member 417 and the developing pressure spring 418 are provided (refer to FIG. 6). The developing pressure member 417 is in contact with a pressure receiving surface 4201 formed on the developing frame 420 when the developing cartridge 42 is mounted to the drum cartridge 41. The developing pressure spring 418 is a compression spring and presses the developing pressure member 417 toward the pressure receiving surface 4201. The developing pressure member 417 and the developing pressure spring 418 constitute an urging unit 500. By pressing the developing cartridge 42, the urging unit 500 presses the developing cartridge 42 so that the development roller 421 moves closer to the photosensitive drum 411. As a result, the development roller 421 is in contact with the photosensitive drum 411 at a predetermined pressure.

Mounting/Dismounting of Process Cartridge

Figure 3A:
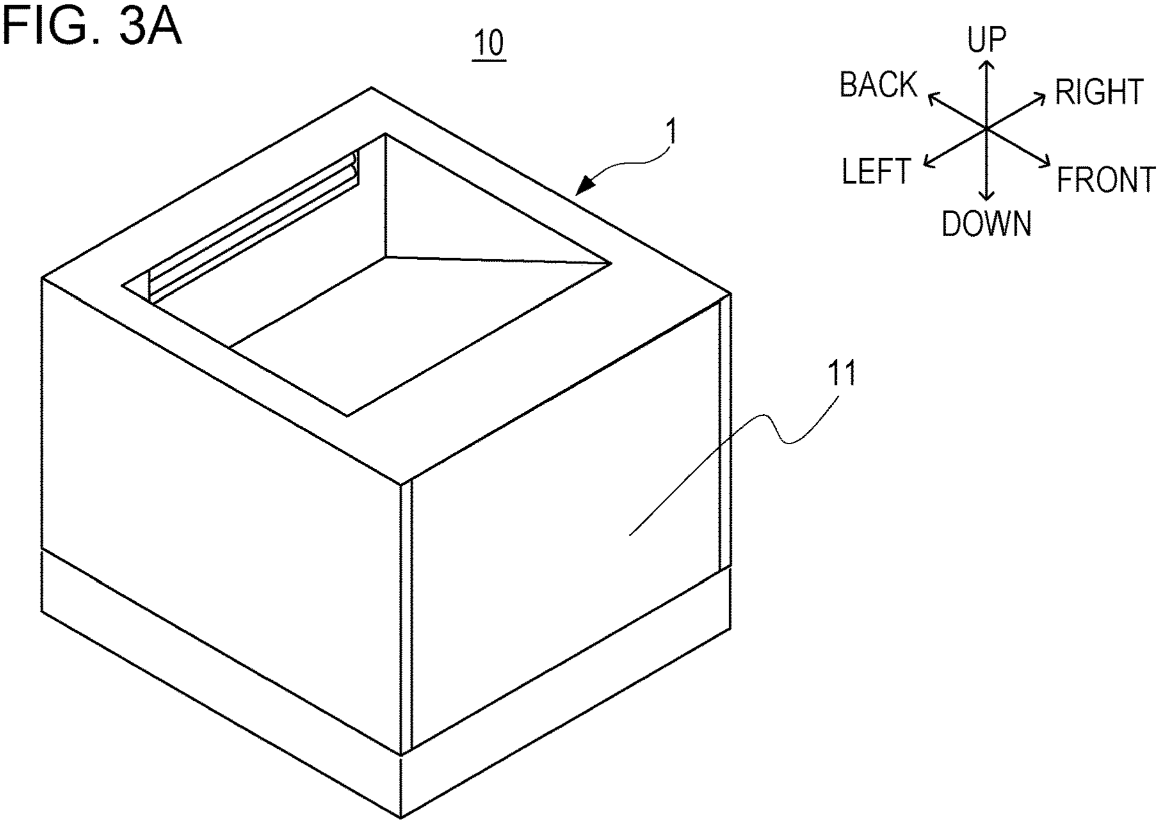
FIG. 3A is a perspective view of the image forming apparatus with a cartridge door closed.
Figure 3B:
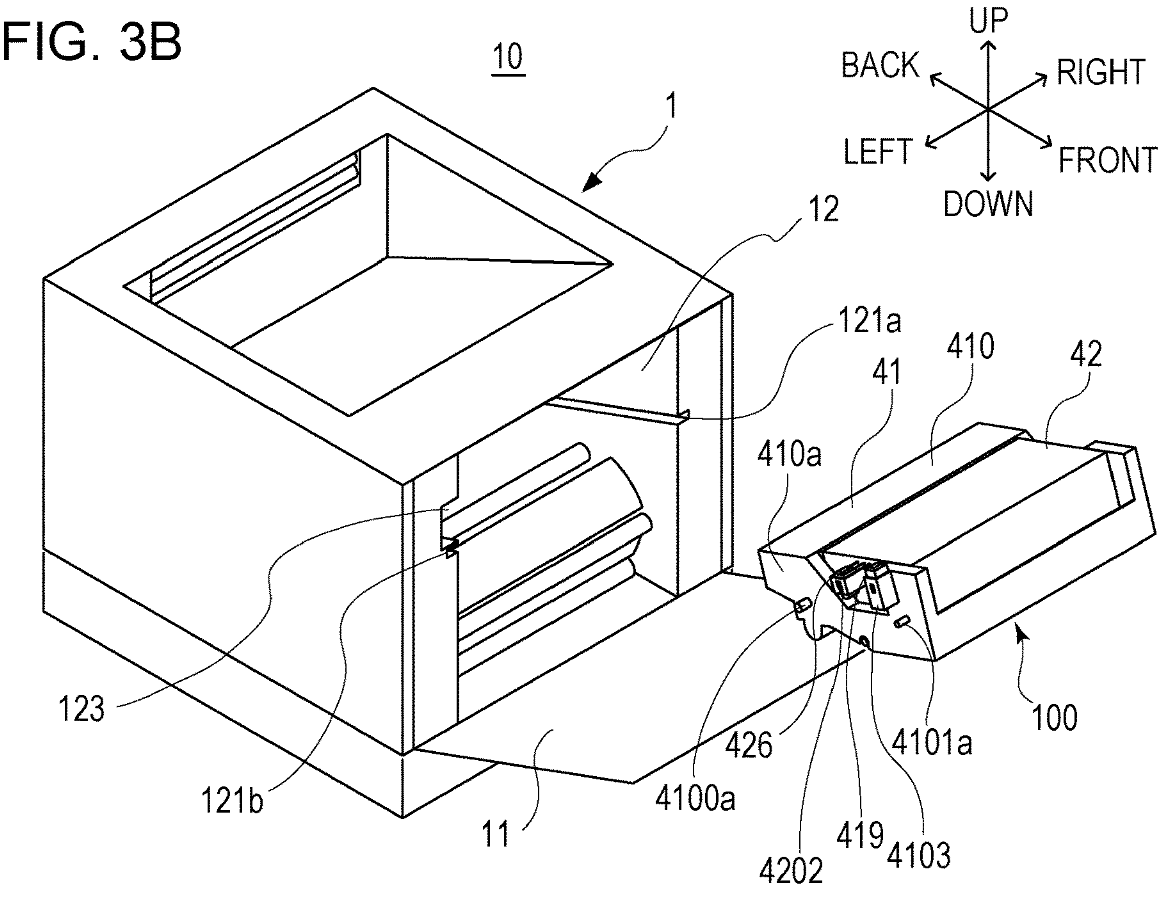
FIG. 3B is a perspective view of the image forming apparatus with the cartridge door open.
Figure 4A:
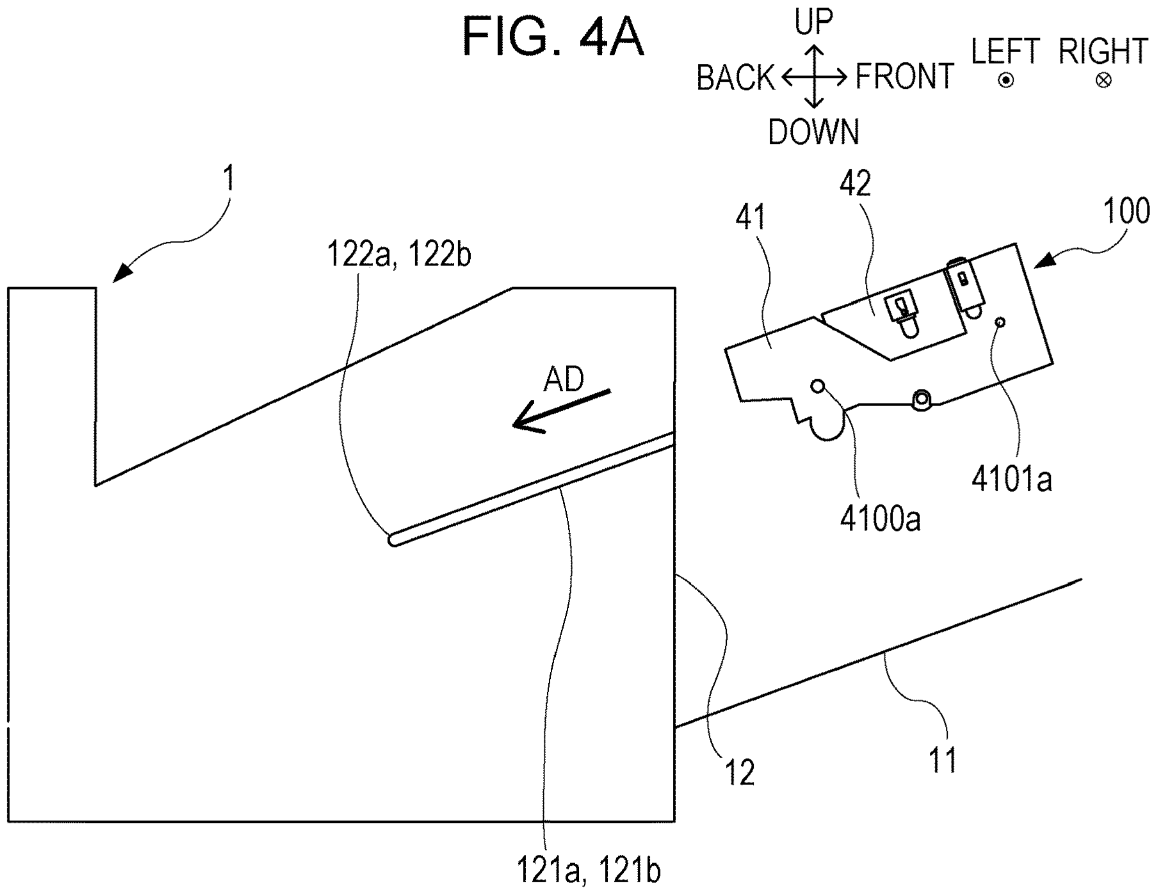
FIG. 4A is a cross-sectional view of an apparatus main body with the process cartridge dismounted.
Figure 4B:
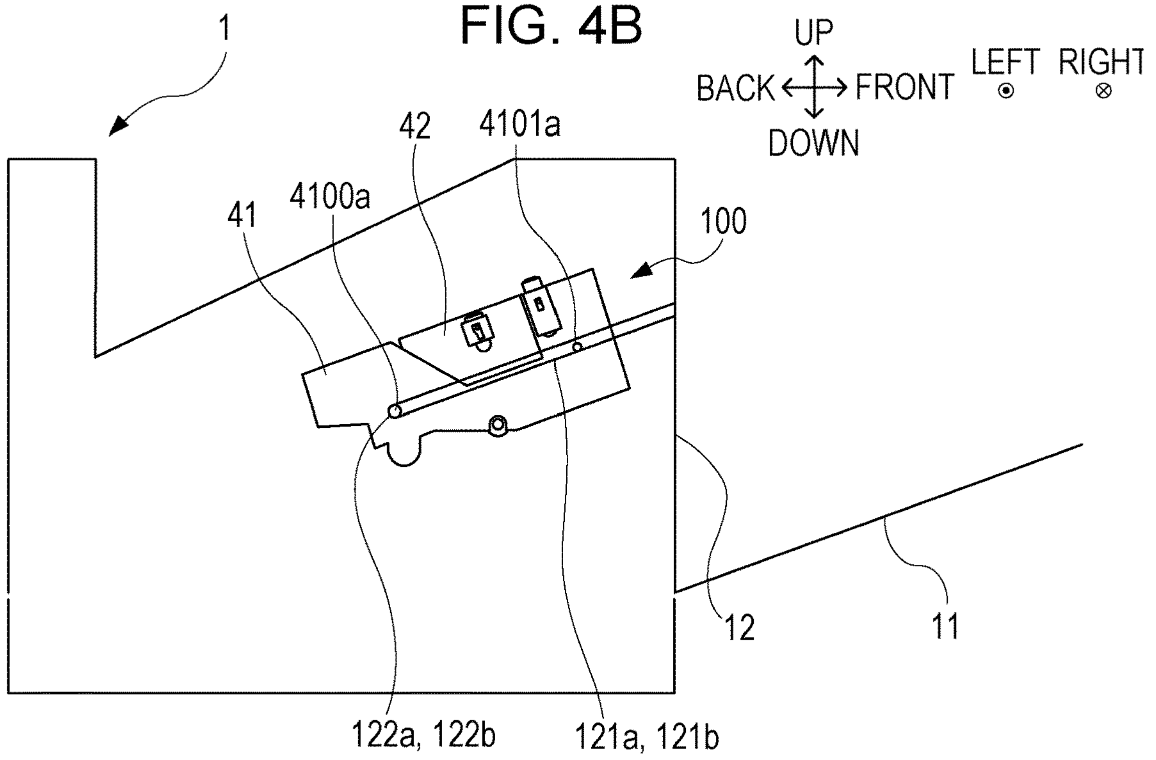
FIG. 4B is a cross-sectional view of the apparatus main body with the process cartridge mounted.
Figure 5A:
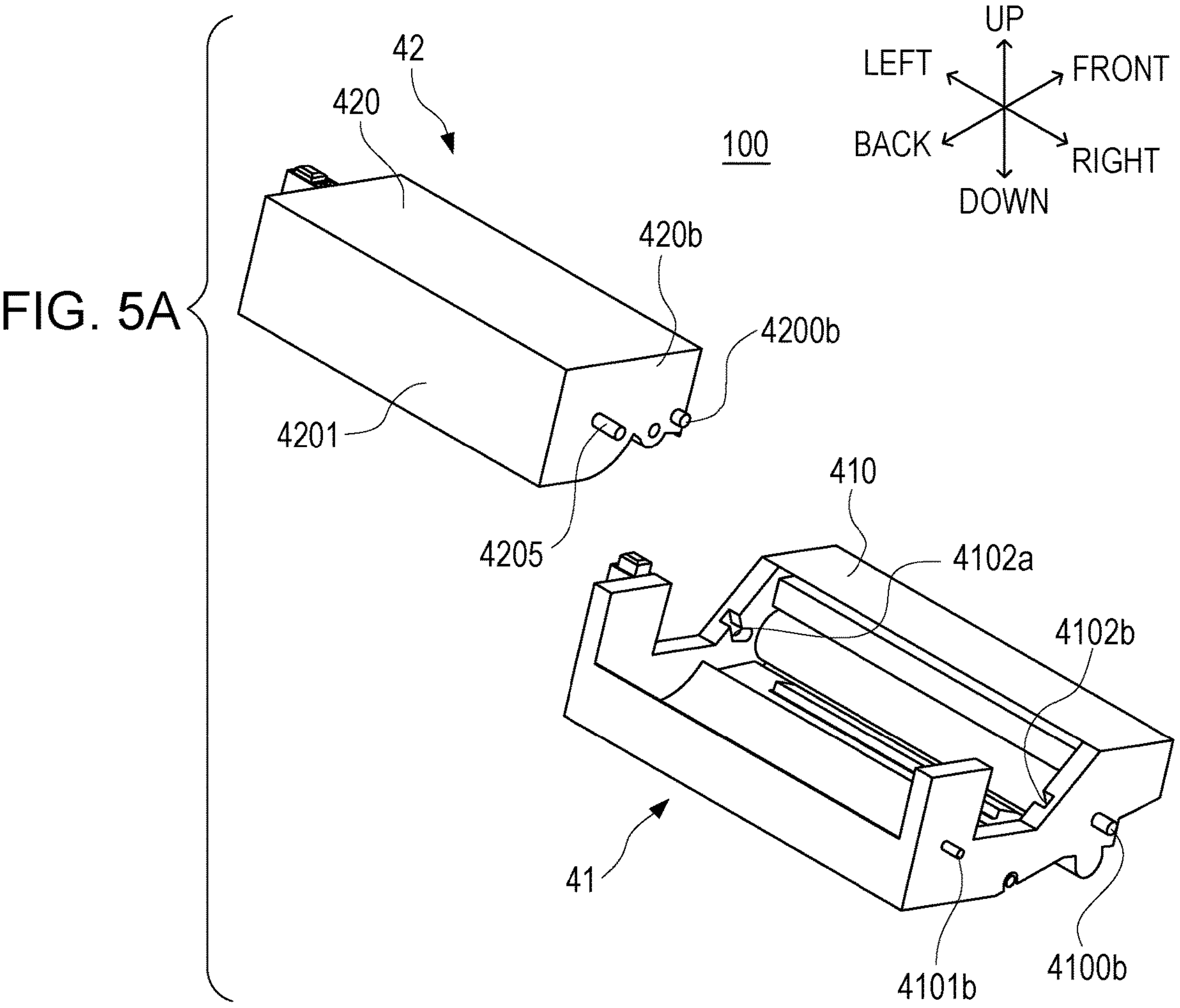
FIG. 5A is a perspective view of a drum cartridge and a developing cartridge that are separated from each other.
Figure 5B:
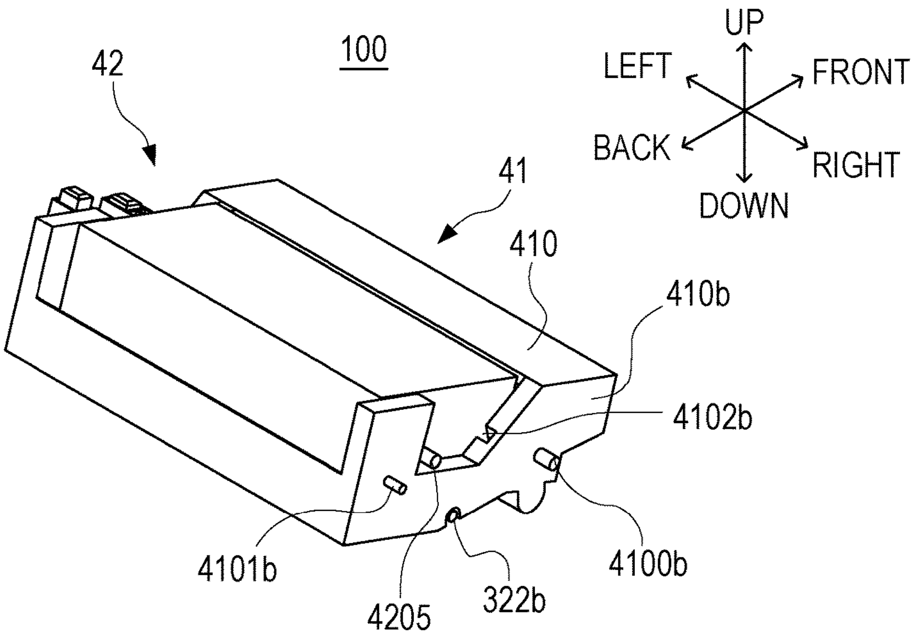
FIG. 5B is a perspective view of the developing cartridge mounted on the drum cartridge.

Mounting/dismounting of the process cartridge 100 to/from the apparatus main body 1 is described below with reference to FIG. 3A to FIG. 5B. FIG. 3A is a perspective view of the image forming apparatus 10 with a cartridge door 11 closed, and FIG. 3B is a perspective view of the image forming apparatus 10 with the cartridge door 11 open. FIG. 4A is a cross-sectional view of the apparatus main body 1 and the process cartridge 100 dismounted from the apparatus main body 1, and FIG. 4B is a cross-sectional view of the apparatus main body 1 and the process cartridge 100 mounted in the apparatus main body 1. FIG. 5A is a perspective view of the drum cartridge 41 and the developing cartridge 42 separated from each other, and FIG. 5B is a perspective view of the developing cartridge 42 mounted to the drum cartridge 41.

As illustrated in FIG. 3A, the image forming apparatus 10 includes the cartridge door 11 that is openably supported by the apparatus main body 1. The cartridge door 11 is attached to the front portion of the apparatus main body 1. When the cartridge door 11 is in the closed position, the cartridge door 11 can prevent entry of light and a foreign matter into the inside of the apparatus main body 1.

As illustrated in FIG. 3B, when a user opens the cartridge door 11, an opening 12 of the apparatus main body 1 is exposed. The opening 12 has cartridge guide grooves 121*a* and 121*b* and a memory guide groove 123 formed therein. The cartridge guide groove 121*a* and the memory guide groove 123 are formed on the left side wall of the opening 12, while the cartridge guide groove 121*b* is formed on the right side wall of the opening 12. As described below, when the cartridge door 11 is open, the process cartridge 100 can be mounted to and dismounted from the apparatus main body 1 through the opening 12. By dismounting the process cartridge 100 from the apparatus main body 1, a sheet S that has jammed inside the apparatus main body 1 can be removed.

As illustrated in FIG. 3B, a drum positioning pin 4100*a* and a drum guide pin 4101*a* protrude from a left side surface 410*a*, which is a side surface of the drum frame 410, in the left direction, that is, in the rotational axis direction of the photosensitive drum 411. As illustrated in FIG. 5B, a drum positioning pin 4100*b* and a drum guide pin 4101*b* protrude from a right side surface 410*b* of the drum frame 410 in the right direction. Furthermore, as illustrated in FIG. 4A, cartridge positioning portions 122*a* and 122*b* are formed at the back ends of the cartridge guide grooves 121*a* and 121*b*, respectively. The cartridge guide grooves 121*a* and 121*b* extend in a mounting direction AD. The mounting direction AD is backward and downward.

As illustrated in FIG. 4A, the process cartridge 100 is mounted in the mounting direction AD toward the opening 12, with the developing cartridge 42 mounted on the drum cartridge 41. Then, as illustrated in FIG. 4B, the drum positioning pin 4100*a* and the drum guide pin 4101*a* formed on the drum cartridge 41 enter the cartridge guide groove 121*a*. The drum positioning pin 4100*b* and drum guide pin 4101*b* also enter the cartridge guide groove 121*b*. As a result, the process cartridge 100 is guided in the mounting direction AD. When the drum positioning pins 4100*a* and 4100*b* are brought into contact with the cartridge positioning portions 122*a* and 122*b*, respectively, mounting of the process cartridge 100 into the apparatus main body 1 is completed. That is, the drum positioning pins 4100*a* and 4100*b* functioning as positioning pins engage with the apparatus main body 1 to position the drum cartridge 41 in place relative to the apparatus main body 1. The drum cartridge 41 and the developing cartridge 42, which constitute the process cartridge 100, can then be mounted on the apparatus main body 1 with a protective member 83 (described below) removed.

The posture of the process cartridge 100 is maintained when the drum positioning pin 4100*a* and the drum guide pin 4101*a* and the drum positioning pin 4100*b* and drum guide pin 4101*b* engage with the cartridge guide groove 121*a*. To dismount the process cartridge 100 from the apparatus main body 1, the reverse operation to that for mounting the process cartridge 100 to the apparatus main body 1 is performed.

The process cartridge 100 is dismounted from the apparatus main body 1 when, for example, either the drum cartridge 41 or the developing cartridge 42 of the process cartridge 100 reaches the end of its service life or when a sheet S is jammed inside the apparatus main body 1. According to the present embodiment, the process cartridge 100 can be mounted to and dismounted from the apparatus main body 1 with the developing cartridge 42 mounted on the drum cartridge 41, making it easy to replace the process cartridge 100 or handle jams.

Mounting/Dismounting of Developing Cartridge

Figure 6:
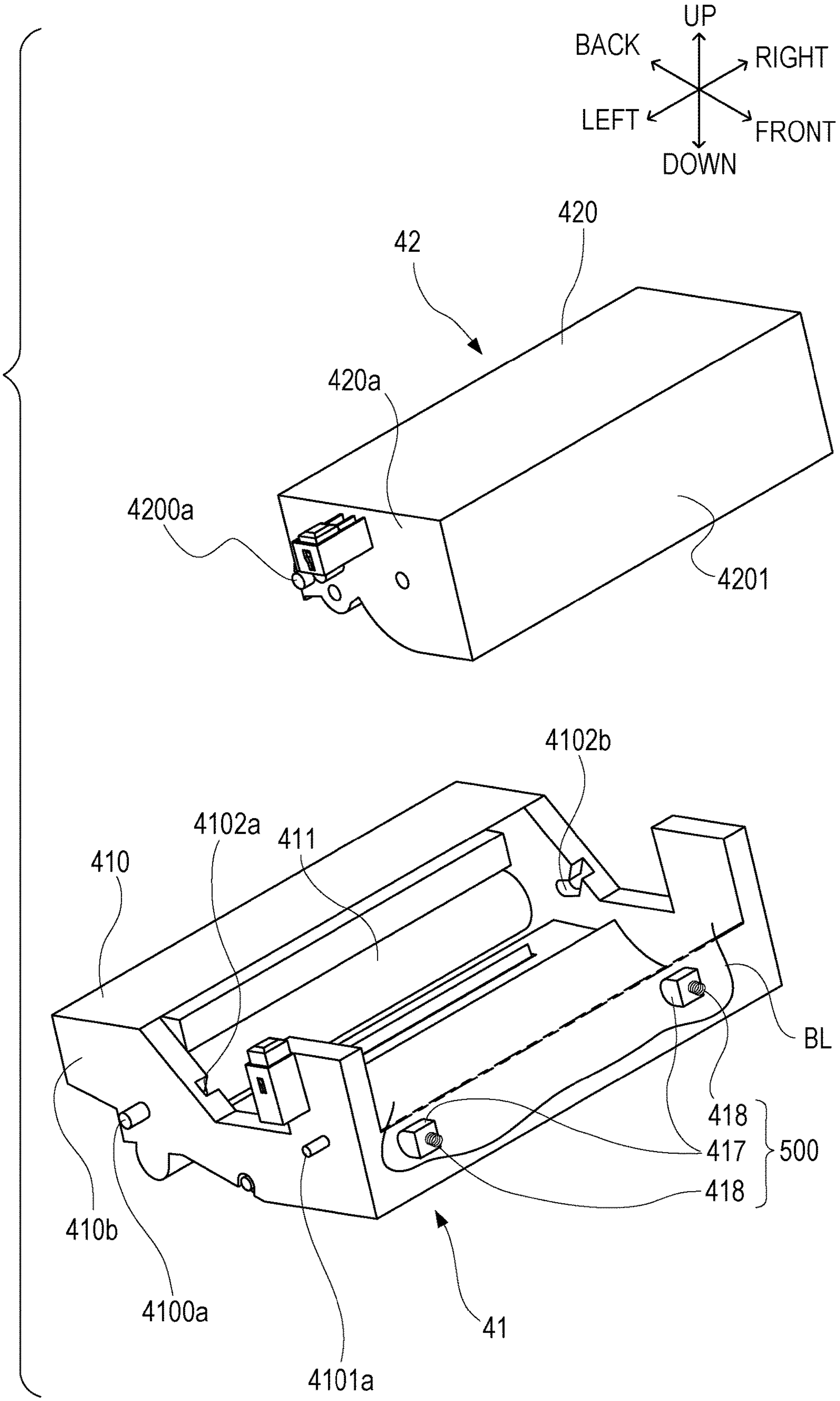
FIG. 6 is a perspective view of the drum cartridge and the developing cartridge that is dismounted from the drum cartridge.

Mounting/dismounting of the developing cartridge 42 to/from the drum cartridge 41 is described below with reference to FIG. 2, FIGS. 5A and 5B, and FIG. 6. FIG. 6 is a perspective view of the drum cartridge 41 and the developing cartridge 42 dismounted from the drum cartridge 41. In FIG. 6, part of the drum frame 410 is cut away at a break line BL so that the urging unit 500 can be seen.

As illustrated in FIGS. 5A and 5B and FIG. 6, development guide grooves 4102*a* and 4102*b* are formed on the inner wall of the drum frame 410. In addition, the front portion of the drum frame 410 has pairs each consisting of the developing pressure member 417 and the developing pressure spring 418, one pair disposed on the left side and the other disposed on the right side. As described above, the developing pressure members 417 and the developing pressure springs 418 constitute the urging unit 500.

A development positioning pin 4200*a* protrudes from a left side surface 420*a*, which is a side surface of the developing frame 420, to the left, that is, in the rotational axis direction of the photosensitive drum 411. A development positioning pin 4200*b* and a protective member engagement pin 4205 protrude from a right side surface 420*b* of the developing frame 420 to the right. The protective member engagement pin 4205 is described below. The developing frame 420 has a pressure receiving surface 4201 that is pressed by the developing pressure member 417.

When the developing cartridge 42 is mounted to the drum cartridge 41, the development positioning pins 4200*a* and 4200*b* engage with the development guide grooves 4102*a* and 4102*b* of the drum frame 410, respectively. The outer diameters of the development positioning pins 4200*a* and 4200*b* and the widths of the development guide grooves 4102*a* are 4102*b* are set so that the pins are fitted to the grooves.

When the developing cartridge 42 is pushed toward the photosensitive drum 411 of the drum cartridge 41, the developing pressure member 417 is pressed by the pressure receiving surface 4201. When the development positioning pins 4200*a* and 4200*b* are brought into contact with the back ends of the development guide grooves 4102*a* and 4102*b*, mounting of the developing cartridge 42 onto the drum cartridge 41 is completed. At this time, as illustrated in FIG. 2, the development roller 421 of the developing cartridge 42 is pressed against the photosensitive drum 411 of the drum cartridge 41 by the action of the urging unit 500. To dismount the developing cartridge 42 from the drum cartridge 41, the reverse operation to that for mounting the developing cartridge 42 to the drum cartridge 41 is performed.

Memory Unit

Figure 7:
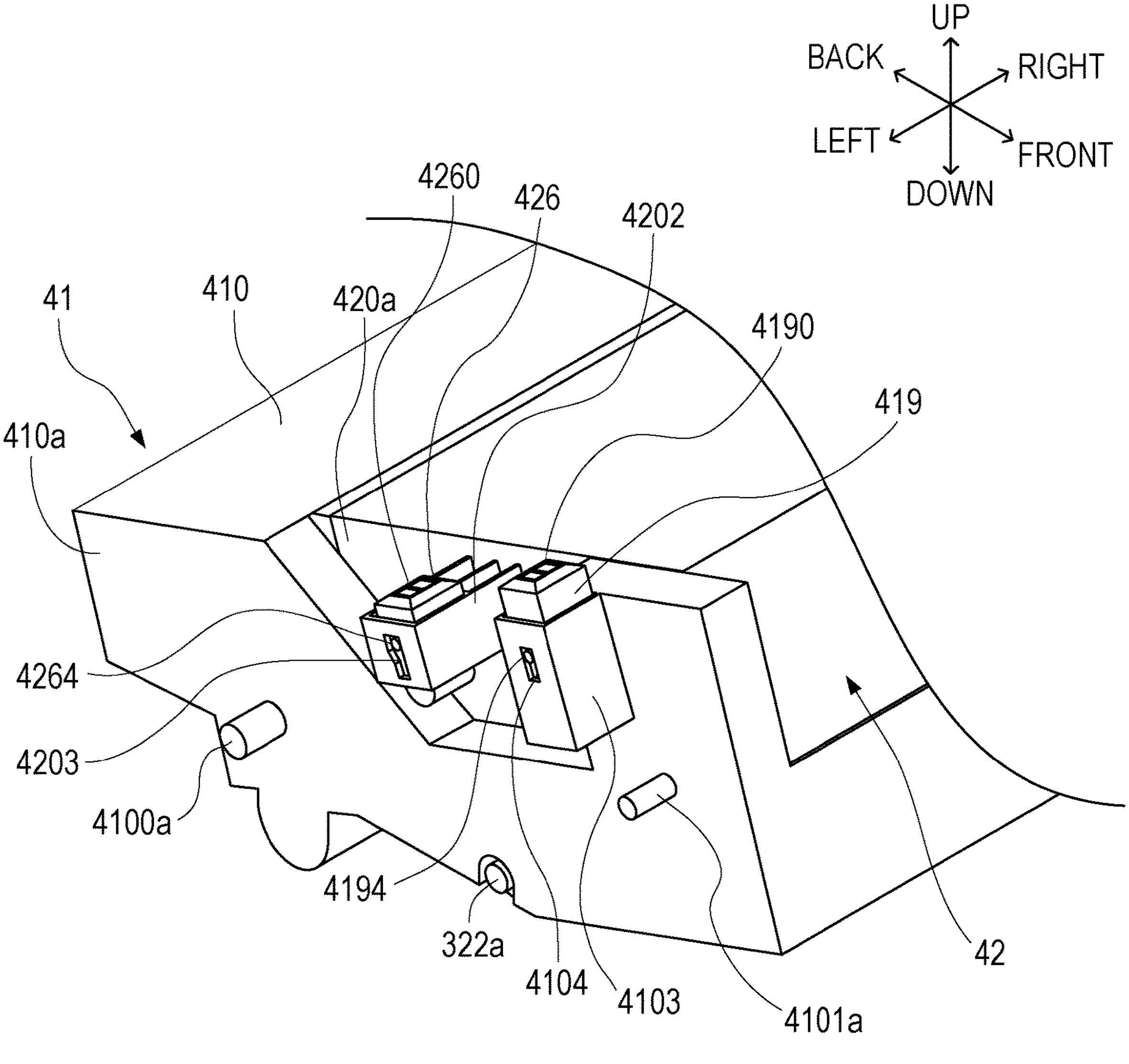
FIG. 7 is a perspective view of the left side surfaces of the drum cartridge and the developing cartridge.
Figure 8A:
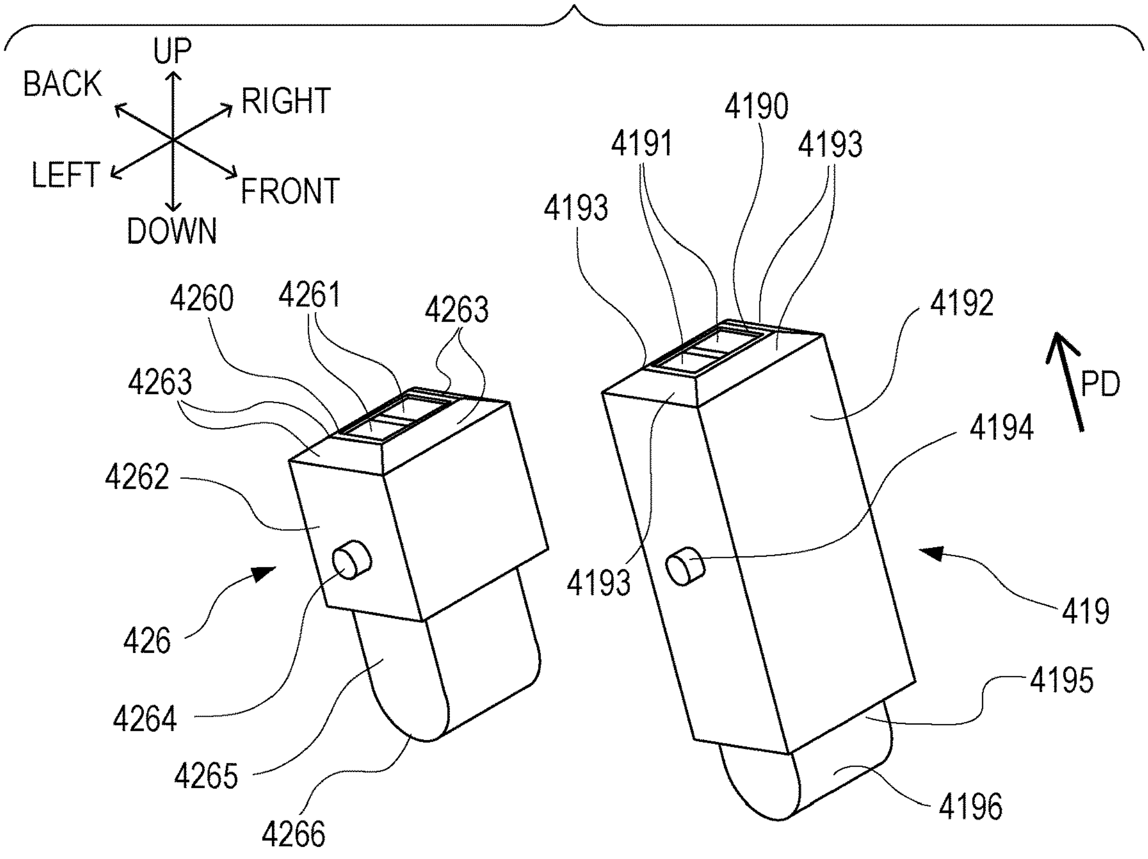
FIG. 8A is a perspective view of a drum memory unit and a developing memory unit.
Figure 8B:
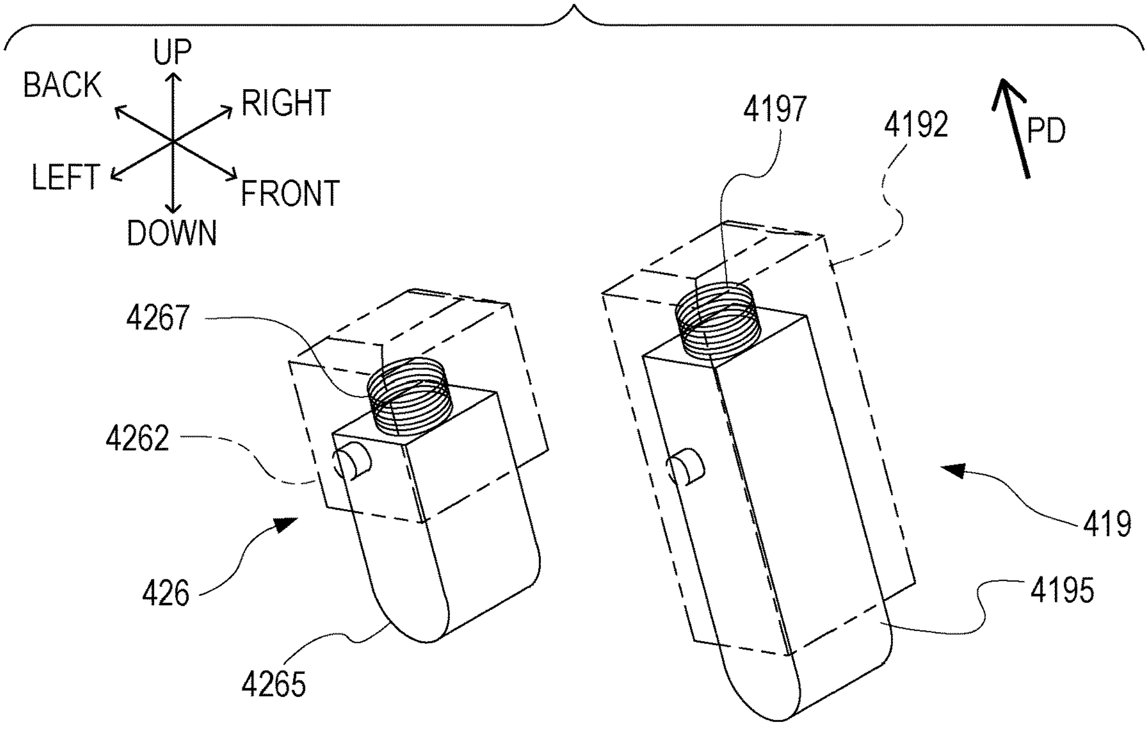
FIG. 8B is a perspective view of the inside of the drum memory unit and the developing memory unit.

A drum memory unit 419 and a developing memory unit 426 are described below with reference to FIGS. 3A and 3B, FIG. 7, and FIGS. 8A and 8B. FIG. 7 is a perspective view of the left side surface 410*a* of the drum cartridge 41 and the left side surface 420*a* of the developing cartridge 42. FIG. 8A is a perspective view of the drum memory unit 419 and the developing memory unit 426. FIG. 8B is a perspective view of the insides of the drum memory unit 419 and the developing memory unit 426. In FIG. 8B, a drum memory holder 4192 and a developing memory holder 4262 are denoted by dash-double-dot lines.

As illustrated in FIG. 3B and FIG. 7, a drum memory housing 4103 is provided on the left side surface 410*a* of the drum frame 410, and the drum memory housing 4103 serving as a first holding unit has a drum memory guide hole 4104. A developing memory housing 4202 is provided on the left side surface 420*a* of the developing frame 420, and a developing memory guide hole 4203 is formed in the developing memory housing 4202 serving as a second holding unit.

As illustrated in FIGS. 8A and 8B, the drum memory unit 419 serving as a first unit memory section includes a drum memory chip 4190, the drum memory holder 4192, a drum memory extended portion 4195, and a drum memory spring 4197. An upper part of the drum memory holder 4192 serving as a first moving member has four tapered surfaces 4193 serving as a first positioned portion, and the left side surface of the drum memory holder 4192 has a drum holder pin 4194 formed thereon. The drum memory chip 4190 is supported by the upper part of the drum memory holder 4192 so as to be surrounded by the tapered surfaces 4193.

The drum memory extended portion 4195 is supported by the drum memory holder 4192 in a movable manner in a pressing direction PD, and part of the drum memory extended portion 4195 is housed in the drum memory holder 4192. The lower part of the drum memory extended portion 4195 has an arc portion 4196, and the arc portion 4196 is exposed from the drum memory holder 4192. The drum memory spring 4197 serving as a first elastic member is disposed between the drum memory holder 4192 and the drum memory extended portion 4195, and the drum memory spring 4197 is covered by the drum memory holder 4192.

The developing memory unit 426 serving as a second unit memory section includes a developing memory chip 4260, the developing memory holder 4262, a developing memory extended portion 4265, and a developing memory spring 4267. An upper part of the developing memory holder 4262 serving as a second moving member has four tapered surfaces 4263 serving as a second positioned portion, and the left side surface of the developing memory holder 4262 has a developing holder pin 4264 formed thereon. The developing memory chip 4260 is supported by the upper part of the developing memory holder 4262 so as to be surrounded by the tapered surfaces 4263.

The developing memory extended portion 4265 is supported by the developing memory holder 4262 in a movable manner in the pressing direction PD, and part of the developing memory extended portion 4265 is housed in the developing memory holder 4262. The lower part of the developing memory extended portion 4265 has an arc portion 4266, and the arc portion 4266 is exposed from the developing memory holder 4262. The developing memory spring 4267 serving as a second elastic member is disposed between the developing memory holder 4262 and the development memory frame 4265, and the developing memory spring 4267 is covered by the developing memory holder 4262.

The drum memory chip 4190 and the developing memory chip 4260 are described below. The configurations of the drum memory chip 4190 and the developing memory chip 4260 are basically the same, and therefore, the drum memory chip 4190 is described below. Description of the configuration of the developing memory chip 4260 that is common to that of the drum memory chip 4190 is omitted, and only the configuration unique to the developing memory chip 4260 is described.

The drum memory chip 4190 includes a plurality of drum memory contacts 4191 and an information storage unit (not illustrated) that stores information regarding the drum cartridge 41. According to the present embodiment, two of the drum memory contacts 4191 are provided. However, more than two drum memory contacts 4191 may be provided. For example, if four drum memory contacts 4191 are provided, each of electrical signals, such as ground, power, clock, and signal, can be allocated to one of the four drum memory contacts 4191. If two drum memory contacts 4191 are provided, it is possible to allocate each of a reference signal and an electrical signal obtained by mixing the power, clock, and signal to one of the drum memory contacts 4191.

The information storage unit built into the drum memory chip 4190 can store both rewritable and non-rewritable information. An example of rewritable information is information that is rewritten in accordance with the usage status of the drum cartridge 41. More specifically, examples of rewritable information include usage history information, such as the number of printed sheets and a usage period, image information, such as a printing ratio, and environmental information, such as a temperature, humidity, and altitude of the location where the image forming apparatus is used. An example of non-rewritable information is information specific to the drum cartridge 41. Examples of the specific information include the unique ID and production lot of the drum cartridge 41, the physical characteristics of the photosensitive drum 411, transfer roller 413, and the cleaning unit 414, and other characteristic value information to optimize the image forming operation. Examples of the specific information regarding the developing cartridge 42 include the characteristic values of the development roller 421, the supply roller 423, and the developer stored in the developer storage section 425.

The drum memory chip 4190 can communicate the information stored in the information storage unit with the control unit 800 (refer to FIG. 1) provided in the apparatus main body 1 via the drum memory contact 4191. The drum memory contacts 4191 can be electrically connected to drum memory electrodes 1235 (refer to FIG. 10) described below, which are provided in the apparatus main body 1.

Thus, by storing the specific information regarding the drum cartridge 41 in the information storage unit, it is possible to perform control suitable for the unique characteristics of the drum cartridge 41. For example, by combining the usage history information, environmental information, and characteristic value information, the print bias, the intensity of light, and the like required for the image forming operation can be optimized. As a specific example, from the usage history information and environmental information, it is possible to calculate the degree of deterioration of the charging unit 412 and adjust the applied bias that is applied to the charging unit 412. The discharge characteristics of the charging unit 412 change with increasing degree of deterioration, affecting the charging potential of the photosensitive drum 411. To optimize the potential of the photosensitive drum 411 using the charging unit 412, it is effective to adjust the applied bias in accordance with the degree of deterioration of the charging unit 412.

As another specific example, it is possible to calculate the degree of deterioration of the photosensitive drum 411 on the basis of the usage history information and environmental information and adjust the intensity of laser beam L emitted from the laser scanner 40. The sensitivity of the photosensitive drum 411 changes with increasing degree of deterioration. To optimize the latent image potential of the photosensitive drum 411 using the laser scanner 40, it is effective to adjust the intensity of the laser beam L from the laser scanner 40 in accordance with the degree of deterioration.

As another specific example, it is possible to calculate the degree of deterioration of the photosensitive drum 411 on the basis of the usage history information and environmental information and control the intensity of light that the static elimination unit 416 emits onto the photosensitive drum 411. To optimize the potential of the photosensitive drum 411 using the static elimination unit 416, it is possible to control the intensity of light emitted from the static elimination unit 416 in accordance with the degree of deterioration of the photosensitive drum 411. As another specific example, it is possible to calculate the degree of deterioration of the transfer roller 413 on the basis of the usage history information and environmental information and adjust the transfer bias applied to the transfer roller 413. The electrical resistance of the transfer roller 413 changes with increasing degree of deterioration. To optimize the transfer bias applied to the transfer roller 413, it is effective to adjust the transfer bias in accordance with the degree of deterioration of the transfer roller 413.

As still another specific example, it is possible to calculate the degree of deterioration of the cleaning unit 414 on the basis of the usage history information and environmental information and adjust the applied bias applied to the cleaning unit 414. The electrical resistance of the cleaning unit 414 may change with increasing degree of deterioration and increasing degree of contamination caused by toner or other substances. To optimize the applied bias applied to the cleaning unit 414, it is effective to adjust the applied bias applied to the cleaning unit 414 in accordance with the degree of deterioration of the cleaning unit 414 and the like.

By storing the specific information regarding the developing cartridge 42 in the information storage unit of the developing memory chip 4260, it is possible to perform control suitable for the unique characteristics of the developing cartridge 42. As a specific example, it is possible to calculate the degrees of deterioration of the development roller 421 and the development blade 422 on the basis of the usage history information and environmental information and adjust the development bias applied to the development roller 421.

The regulatory force that regulates the layer thickness of the developer and the development efficiency change with increasing degrees of deterioration of the development roller 421 and the development blade 422. By optimizing the development bias applied to the development roller 421, the layer thickness and the development efficiency of the developer can be optimized.

Floating Support of Drum Memory Unit and Developing Memory Unit

Figure 9:
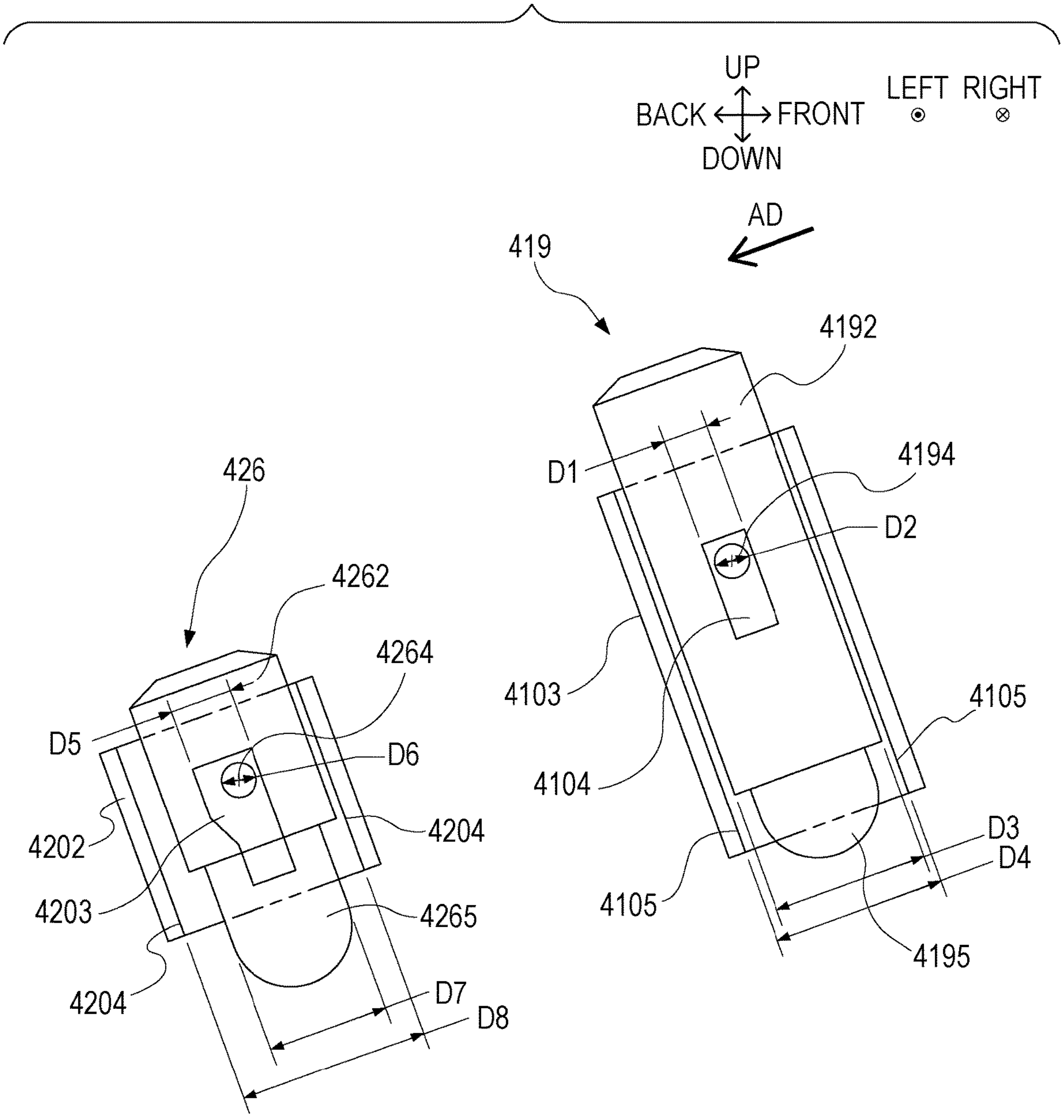
FIG. 9 is a schematic illustration of the drum memory unit and the developing memory unit supported by a drum memory housing and a developing memory housing, respectively.

The support of the drum memory unit 419 and the developing memory unit 426 is described below with reference to FIG. 9. FIG. 9 is a schematic illustration of the drum memory unit 419 and the developing memory unit 426 supported by the drum memory housing 4103 and the developing memory housing 4202, respectively.

As illustrated in FIG. 9, the drum memory unit 419 is assembled in the drum memory housing 4103. Let D1 be the width of the drum memory guide hole 4104 in the mounting direction AD, and let D2 be the diameter of the drum holder pin 4194. Let D3 be the width of the drum memory holder 4192 in the mounting direction AD, and let D4 be the distance between inner walls 4105 of the drum memory housing 4103. Then, according to the present embodiment, settings are made such that D1-D2>D4-D3. Therefore, the drum memory unit 419 is supported in the drum memory housing 4103 in a movable manner within the range that the drum holder pin 4194 can move in the drum memory guide hole 4104. Such movable support is hereinafter referred to as “floating support”.

The developing memory unit 426 is assembled in the developing memory housing 4202. Let D5 be the width of the developing memory guide hole 4203 in the mounting direction AD, and let D6 be the diameter of the developing holder pin 4264. Let D7 be the width of the developing memory holder 4262 in the mounting direction AD, and let D8 be the distance between inner walls 4204 of the developing memory housing 4202. Then, according to the present embodiment, the settings are made such that D5-D6>D8-D7. Thus, the developing memory unit 426 is floating supported in the developing memory housing 4202.

Memory Guide Groove

Figure 10:
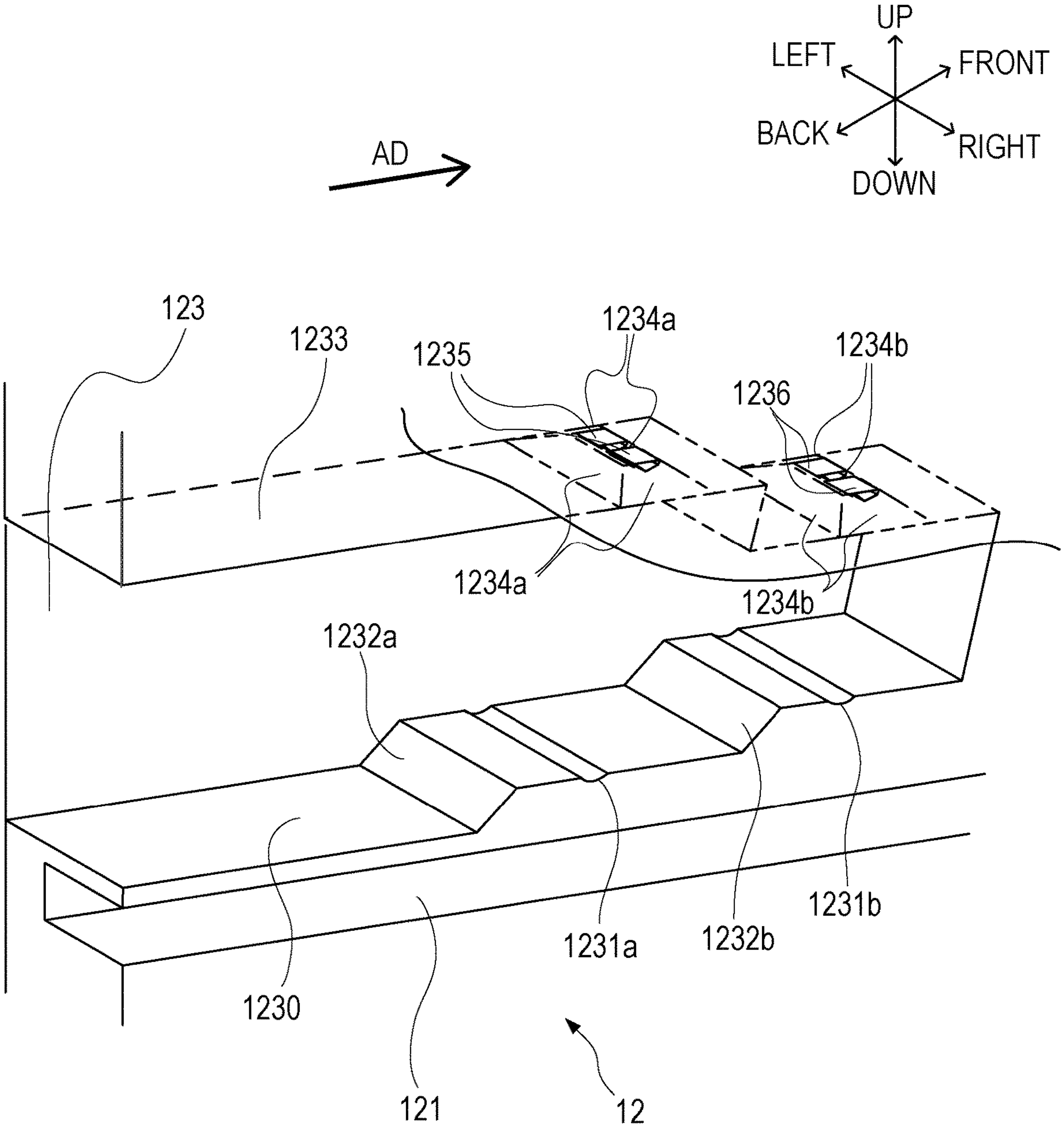
FIG. 10 is a perspective view of a memory guide groove.

The memory guide groove 123 is described below with reference to FIGS. 3B and FIG. 10. FIG. 10 is a perspective view of the memory guide groove 123. As illustrated in FIGS. 3B and FIG. 10, the memory guide groove 123 is formed above the cartridge guide groove 121 and on the left inner wall of the opening 12. The memory guide groove 123 guides the drum memory unit 419 and the developing memory unit 426 in the mounting direction AD when the process cartridge 100 is mounted to the apparatus main body 1.

The memory guide groove 123 has an extended-portion contact surface 1230 formed at the bottom and a holder contact surface 1233 formed at the top. A drum memory electrode 1235 serving as a first main body contact and a developing memory electrode 1236 serving as a second main body contact are assembled to the holder contact surface 1233. The holder contact surface 1233 has four tapered surfaces 1234*a* formed to surround the drum memory electrode 1235 and four tapered surfaces 1234*b* formed to surround the developing memory electrode 1236.

The tapered surfaces 1234*a* serving as a first positioning portion of the holder contact surface 1233 engage with the tapered surfaces 4193 of the drum memory holder 4192 when the process cartridge 100 is mounted in the apparatus main body 1. According to the present embodiment, the tapered surfaces 1234*a* and the tapered surfaces 4193 are formed so as to have the same slope angle. However, the slope angles may be different from each other.

The tapered surfaces 1234*b* serving as a second positioning portion of the holder contact surface 1233 engage with the tapered surfaces 4263 of the developing memory holder 4262 when the process cartridge 100 is mounted in the apparatus main body 1. According to the present embodiment, the tapered surfaces 1234*b* and the tapered surfaces 4263 are formed so as to have the same slope angle. However, the slope angles may be different from each other.

The extended-portion contact surface 1230 consists of a slope surface 1232*a*, an extended-portion positioning portion 1231*a*, a slope surface 1232*b*, and an extended-portion positioning portion 1231*b* arranged in order from upstream to downstream in the mounting direction AD of the process cartridge 100.

The extended-portion positioning portion 1231*a* engages with the arc portion 4196 of the drum memory extended portion 4195 serving as a first contact member of the drum memory unit 419 when the process cartridge 100 is mounted in the apparatus main body 1. According to the present embodiment, the arc-shaped extended-portion positioning portion 1231*a* and the arc portion 4196 are formed so as to have the same curvature. However, the curvatures may be different from each other.

Similarly, the extended-portion positioning portion 1231*b* engages with the arc portion 4266 of the developing memory extended portion 4265 serving as a second contact member of the developing memory unit 426 when the process cartridge 100 is mounted in the apparatus main body 1. According to the present embodiment, the arc-shaped extended-portion positioning portion 1231*b* and the arc portion 4266 are formed so as to have the same curvature. However, the curvatures may be different from each other.

As described above, the positioning of the drum memory unit 419 is accomplished relative to the apparatus main body 1 when the tapered surface 4193 and the arc portion 4196 of the drum memory unit 419 engage with the tapered surface 1234*a* and the extended-portion positioning portion 1231*a* of the memory guide groove 123, respectively. At this time, the drum memory contact 4191 (refer to FIG. 8A) of the drum memory unit 419 is in contact with the drum memory electrode 1235 and is electrically connected to the drum memory electrode 1235.

When the tapered surface 4263 and the arc portion 4266 of the developing memory unit 426 engage with the tapered surface 1234*b* and the extended-portion positioning portion 1231*b* of the memory guide groove 123, respectively, the positioning of the developing memory unit 426 is accomplished relative to the apparatus main body 1. At this time, the developing memory contact 4261 (refer to FIG. 8A) of the developing memory unit 426 is in contact with the developing memory electrode 1236 and is electrically connected to the developing memory electrode 1236. The information stored in the information storage units of the drum memory unit 419 and the developing memory unit 426 can then be communicated with the control unit 800 (refer to FIG. 1).

Connection Between Drum Memory Contact and Drum Memory Electrode

The connection between the drum memory contact 4191 and the drum memory electrode 1235 is described in more detail below with reference to FIGS. 11A and 11B. The configuration regarding the connection between the drum memory contact 4191 and the drum memory electrode 1235 is the same as that between the developing memory contact 4261 and the developing memory electrode 1236. For this reason, the connection between drum memory contact 4191 and drum memory electrode 1235 is described as an example, and description of the connection between the developing memory contact 4261 and the developing memory electrode 1236 is omitted.

Figure 11A:
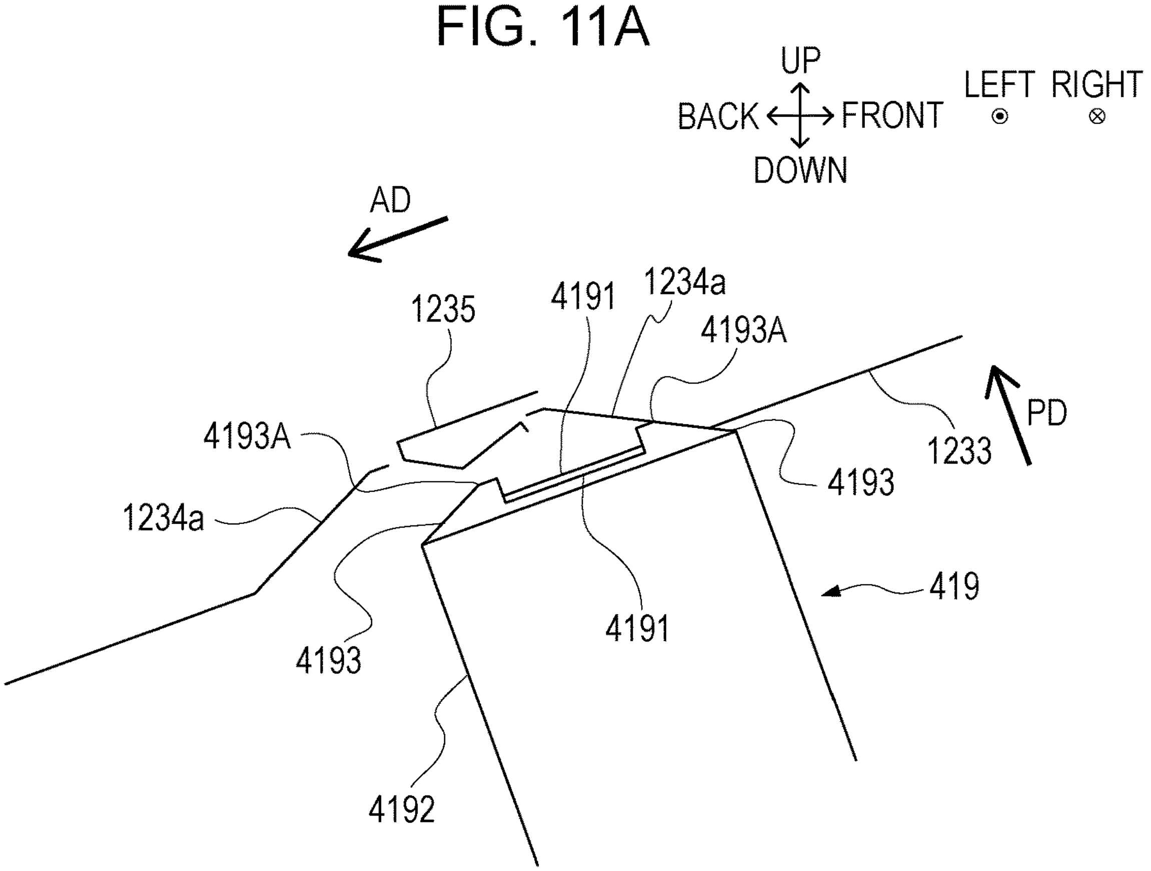
FIG. 11A is a side view of a drum memory electrode and a drum memory contact immediately before the process cartridge is mounted to the apparatus main body.

FIG. 11A is a side view of the drum memory electrodes 1235 and the drum memory contacts 4191 immediately before mounting of the process cartridge 100 to the apparatus main body 1 is completed. FIG. 11B is a side view of the drum memory electrode 1235 and the drum memory contact 4191 after mounting of the process cartridge 100 to the apparatus main body 1 is completed.

As illustrated in FIG. 11A, the drum memory electrode 1235 includes a flat spring, and when separated from the drum memory contact 4191, the flat spring is released. The drum memory contact 4191 is provided at a position that is recessed from a top surface 4193A of the tapered surface 4193 while facing upstream in the pressing direction PD.

Figure 11B:
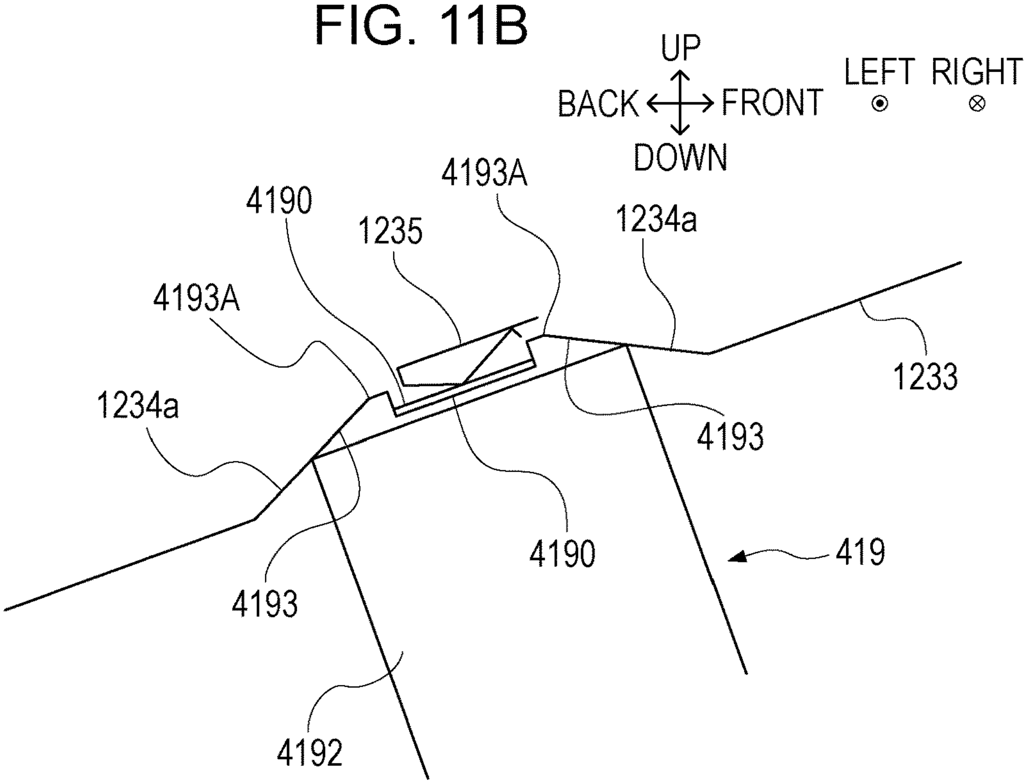
FIG. 11B is a side view of the drum memory electrode and the drum memory contact after the process cartridge is mounted to an apparatus main body.

As illustrated in FIG. 11B, after the process cartridge 100 is mounted in the apparatus main body 1, the tapered surface 4193 of the drum memory holder 4192 and the tapered surface 1234*a* of the holder contact surface 1233 are in contact with each other so as to overlap each other. This determines the position of the drum memory unit 419 relative to the memory guide groove 123 of the apparatus main body 1, as described above. At this time, the drum memory electrode 1235 is pressed against the drum memory contact 4191 and is elastically deformed. Thus, the drum memory electrode 1235 and the drum memory contact 4191 are in contact with each other at an appropriate pressure.

Contact of the tapered surface 4193 with the tapered surface 1234*a* fixes the distance between the drum memory electrode 1235 and the drum memory contact 4191. Therefore, the drum memory electrode 1235 and the drum memory contact 4191 are in contact with each other at the appropriate pressure without being affected by the contact pressure between the tapered surface 1234*a* and the tapered surface 4193. Since the drum memory contact 4191 is set at a position that is recessed from the top surface 4193A of the tapered surface 4193, the holder contact surface 1233 does not slide against the drum memory contacts 4191 when the drum memory unit 419 moves in the memory guide groove 123.

Movement of Drum Memory Unit and Developing Memory Unit

The movement of the drum memory unit 419 and the developing memory unit 426 when the process cartridge 100 is mounted in the apparatus main body 1 is described below with reference to FIG. 9 and FIGS. 12A to 12C.

Figure 12A:
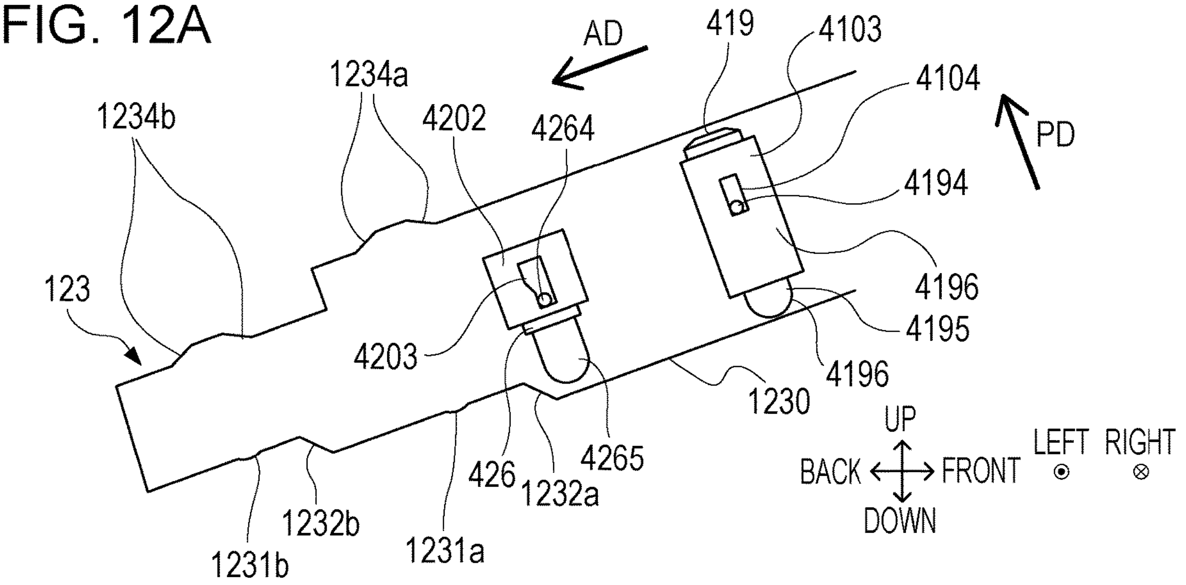
FIG. 12A is a side view of the memory guide groove when the drum memory unit and the developing memory unit initially enter the memory guide groove.
Figure 12B:
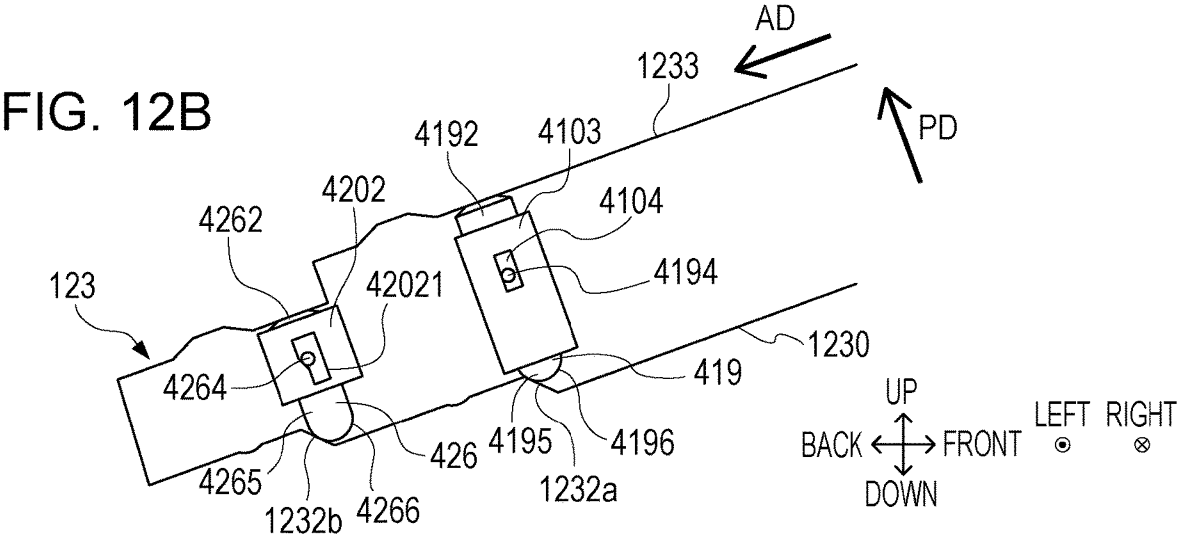
FIG. 12B Side view of the memory guide groove when the drum memory unit and the developing memory unit further enter the memory guide groove.
Figure 12C:
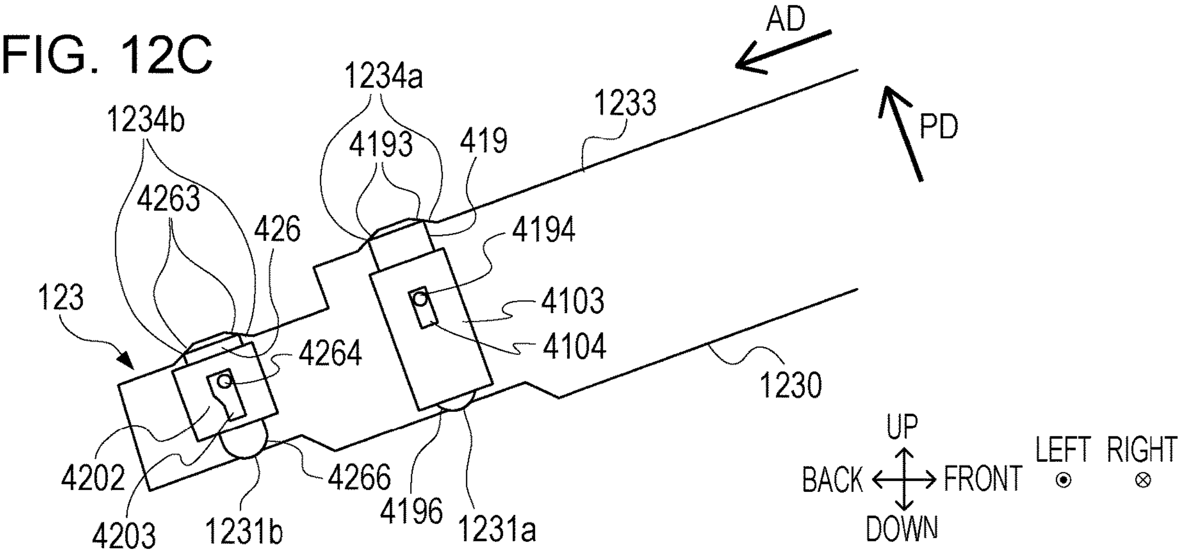
FIG. 12C is a side view of the drum memory unit and the developing memory unit when the process cartridge is mounted to the apparatus main body.

FIG. 12A is a side view of the drum memory unit 419 and the developing memory unit 426 that initially enter the inside of the memory guide groove 123. FIG. 12B is a side view of the drum memory unit 419 and the developing memory unit 426 that have further entered the inside of the memory guide groove 123. FIG. 12C is a side view of the drum memory unit 419 and developing memory unit 426 when mounting of the process cartridge 100 in the apparatus main body 1 has been completed. In FIG. 12C, the positions of the drum memory unit 419 and the developing memory unit 426 are determined in the memory guide groove 123.

As illustrated in FIG. 12A, the drum memory unit 419 is lowered under its own weight against the drum memory housing 4103. At this time, the drum holder pin 4194 is in contact with the lowest part of the drum memory guide hole 4104, and the downward movement of the drum memory unit 419 is restricted. Similarly, the developing holder pin 4264 of the developing memory unit 426 is in contact with the lowest part of the developing memory guide hole 4203, and the downward movement of the developing memory unit 426 is restricted. Since the drum memory unit 419 and the developing memory unit 426 are not in contact with the memory guide groove 123 in FIG. 12A, the drum memory spring 4197 and the developing memory spring 4267 (refer to FIG. 8B) are released.

As illustrated in FIG. 12B, as the drum memory unit 419 is moved in the memory guide groove 123 in the mounting direction AD, the slope surface 1232*a* is brought into contact with the arc portion 4196 of the drum memory extended portion 4195 of the drum memory unit 419. As the drum memory unit 419 is further moved in the memory guide groove 123 in the mounting direction AD, the drum memory extended portion 4195 of the drum memory unit 419 moves along the slope surface 1232*a* in the pressing direction PD. The pressing direction PD is perpendicular to the mounting direction AD.

Similarly, since the slope surface 1232*b* is brought into contact with the arc portion 4266 of the developing memory extended portion 4265 of the developing memory unit 426, the developing memory extended portion 4265 moves along the slope surface 1232*b* in the pressing direction PD. Before being brought into contact with the slope surface 1232*b*, the developing memory extended portion 4265 is brought into contact with the slope surface 1232*a* and moves in the mounting direction AD while sliding on the extended-portion contact surface 1230.

As the drum memory extended portion 4195 moves in the pressing direction PD along the slope surface 1232*a*, the drum memory holder 4192 is pressed in the pressing direction PD by the drum memory extended portion 4195 via the drum memory spring 4197 (refer to FIG. 8B). As a result, the drum memory holder 4192 is brought into contact with the holder contact surface 1233 of the memory guide groove 123. When the drum memory extended portion 4195 moves along the slope surface 1232*a* in the pressing direction PD with the drum memory extended portion 4195 in contact with the slope surface 1232*a* and with the drum memory holder 4192 in contact with the holder contact surface 1233, the drum memory spring 4197 is compressed. Thus, the length of the drum memory unit 419 in the pressing direction PD is decreased.

Similarly, when developing memory extended portion 4265 moves along the slope surface 1232*b* in the pressing direction PD with the developing memory extended portion 4265 in contact with the slope surface 1232*b* and with the developing memory holder 4262 in contact with the holder contact surface 1233, the developing memory spring 4267 is compressed. Thus, the length of the developing memory unit 426 in the pressing direction PD is decreased.

The drum memory unit 419 and the developing memory unit 426 are floating supported against the drum memory housing 4103 and the developing memory housing 4202, respectively. Therefore, the movement of the drum memory unit 419 and the developing memory unit 426 described above is not interfered.

As illustrated in FIG. 12C, when mounting of the process cartridge 100 to the apparatus main body 1 is completed, the positioning of the drum memory unit 419 and the developing memory unit 426 can be accomplished relative to the memory guide groove 123 of the apparatus main body 1, as described above. More specifically, the positioning of the drum memory unit 419 is accomplished relative to the memory guide groove 123 when the tapered surface 4193 and the arc portion 4196 engage with the tapered surface 1234*a* and the extended-portion positioning portion 1231*a* of the memory guide groove 123, respectively. At this time, the drum memory unit 419 presses against the extended-portion positioning portion 1231*a* and the tapered surface 1234*a* by the elastic force of the drum memory spring 4197. Therefore, the drum memory unit 419 can be stably positioned in place in the memory guide groove 123.

Furthermore, since the drum memory unit 419 is floating supported, the position of the drum memory unit 419 can remain unchanged in the memory guide groove 123 even if the position of the drum cartridge 41 varies. Thus, by floating supporting the drum memory unit 419, contact of the drum memory electrode 1235 with the drum memory contact 4191 can be stably maintained even if the position of the drum cartridge 41 varies.

Similarly, the positioning of the developing memory unit 426 is accomplished relative to the memory guide groove 123 when the tapered surface 4263 and the arc portion 4266 engage with the tapered surface 1234*b* and the extended-portion positioning portion 1231*b* of the memory guide groove 123, respectively. At this time, the developing memory unit 426 presses against the extended-portion positioning portion 1231*b* and the tapered surface 1234*b* by the elastic force of the developing memory spring 4267. Therefore, the developing memory unit 426 can be stably positioned in place in the memory guide groove 123.

Furthermore, since the developing memory unit 426 is floating supported, the position of the developing memory unit 426 can remain unchanged in the memory guide groove 123 even if the position of the developing cartridge 42 varies. Thus, by floating supporting the developing memory unit 426, contact of the developing memory electrode 1236 with the developing memory contact 4261 can be stably maintained even if the position of the developing cartridge 42 varies.

As described above, the developing cartridge 42 becomes an integral part of the drum cartridge 41 when being mounted to the drum cartridge 41. Therefore, the variation of the drum cartridge 41 may be added to the variation of the developing cartridge 42. Therefore, it is desirable to satisfy the condition D5-D6>D1-D2 (refer to FIG. 9).

As described above, according to the present embodiment, the drum memory unit 419 and the developing memory unit 426 are floating supported. This allows stable contact of the drum memory electrode 1235 and the developing memory electrode 1236 with the drum memory contact 4191 and the developing memory contact 4261, respectively, even if the position of the drum cartridge 41 or the developing cartridge 42 varies.

Method for Packing Drum Cartridge and Developing Cartridge

Figure 13A:
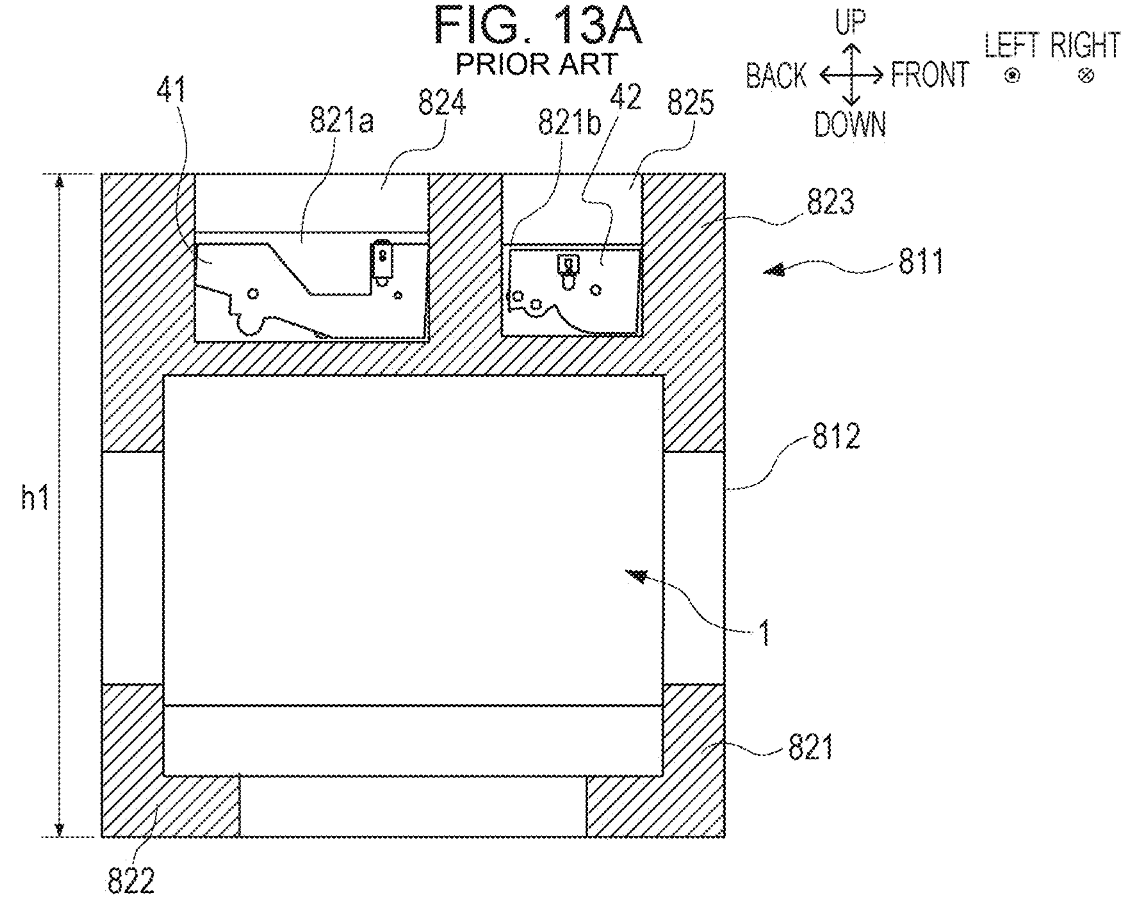
FIG. 13A PRIOR ART
FIG. 13A is a schematic illustration of a method for packing a drum cartridge and a developing cartridge according to a comparative example.
Figure 13B:
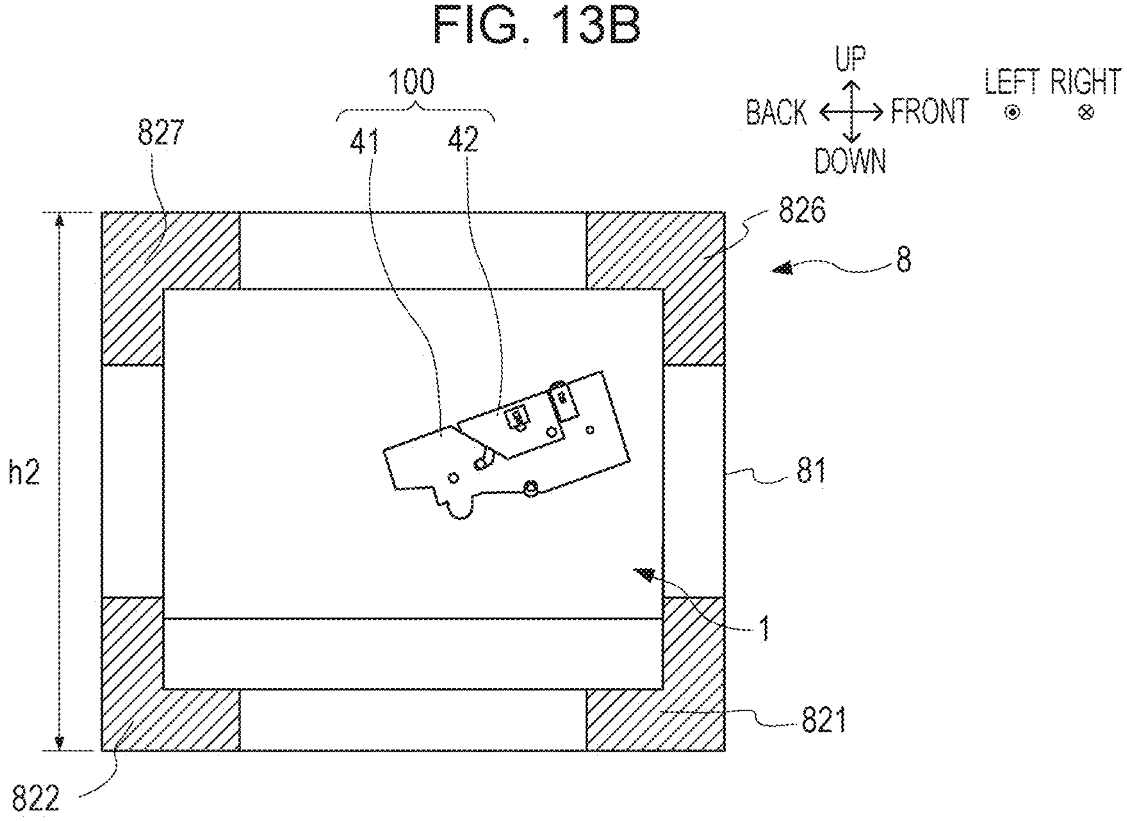
FIG. 13B is a schematic illustration of a method for packing a drum cartridge and a developing cartridge according to an embodiment.

The method for packing the drum cartridge 41 and the developing cartridge 42 is described below with reference to FIGS. 13A and 13B. FIG. 13A is a schematic illustration of the method for packing the drum cartridge 41 and the developing cartridge 42 according to a comparative example, and FIG. 13B is a schematic illustration of the method for packing the drum cartridge 41 and the developing cartridge 42 according to the present embodiment.

As illustrated in FIG. 13A, according to the comparative example, the drum cartridge 41 and the developing cartridge 42 are packed outside the apparatus main body 1. More specifically, in FIG. 13A, the apparatus main body 1, the drum cartridge 41, and the developing cartridge 42 are packed using a packing material 811, which includes a packing box 812 and cushioning materials 821, 822, 823, 824, and 825.

The packing box 812 is a box for packing the image forming apparatus. The cushioning materials 821, 822, 823, 824, and 825 are cushioning materials that cushion shocks and vibrations during transport. The apparatus main body 1 is housed in the packing box 812 so as to be surrounded by the cushioning materials 821, 822, and 823 for protection. The cushioning material 823 disposed above the apparatus main body 1 has a drum cartridge housing section 821*a* and a developing cartridge housing section 821*b* each having open top.

The drum cartridge 41 is housed in the drum cartridge housing section 821*a* and is covered above by the cushioning material 824. The developing cartridge 42 is housed in the developing cartridge housing section 821*b* and is covered above by the cushioning material 825.

Thus, the apparatus main body 1, the drum cartridge 41, and the developing cartridge 42 are surrounded by the cushioning materials 821, 822, 823, 824, and 825 and are packed in the packing box 812, which is then shipped. In this way, the apparatus main body 1, the drum cartridge 41, and the developing cartridge 42 are protected by the cushioning materials 821, 822, 823, 824, and 825 even if they are subjected to vibration or shock during transport. This reduces damage to the apparatus main body 1, the drum cartridge 41, and the developing cartridge 42. This packing form is hereinafter referred to as "cartridge outside packing".

As illustrated in FIG. 13B, according to the present embodiment, the image forming apparatus is packed by a packing material 8. The packing material 8 includes a packing box 81 and cushioning materials 821, 822, 826, and 827. According to the present embodiment, the process cartridge 100 formed by integrating the drum cartridge 41 and the developing cartridge 42 is included inside the apparatus main body 1, and the apparatus main body 1 is packed. Therefore, unlike the above-described comparative example, there is no need to form the drum cartridge housing section 821*a* and the developing cartridge housing section 821*b* in the cushioning material inside the individual packing box 81. This packing configuration is hereinafter referred to as "cartridge inside packing".

The cartridge inside packing allows for a more compact packing size than the cartridge outside packing. Let h1 be the height of the packing material 811 in the case of the cartridge outside packing illustrated in FIG. 13A, and let h2 be the height of the packing material 8 in the case of the cartridge inside packing illustrated in FIG. 13B. Then, the height of the packing material 8 in the case of the cartridge inside packing can be less than that in the case of the cartridge outside packing, because there is no need to form the drum cartridge housing section 821*a* and the developing cartridge housing section 821*b* in the cushioning material. Therefore, the condition h1>h2 can be satisfied. That is, the volume of the packing material 8 can be reduced by employing the cartridge inside packing, and thus, the transport efficiency can be improved.

Protective Member

Figure 14A:
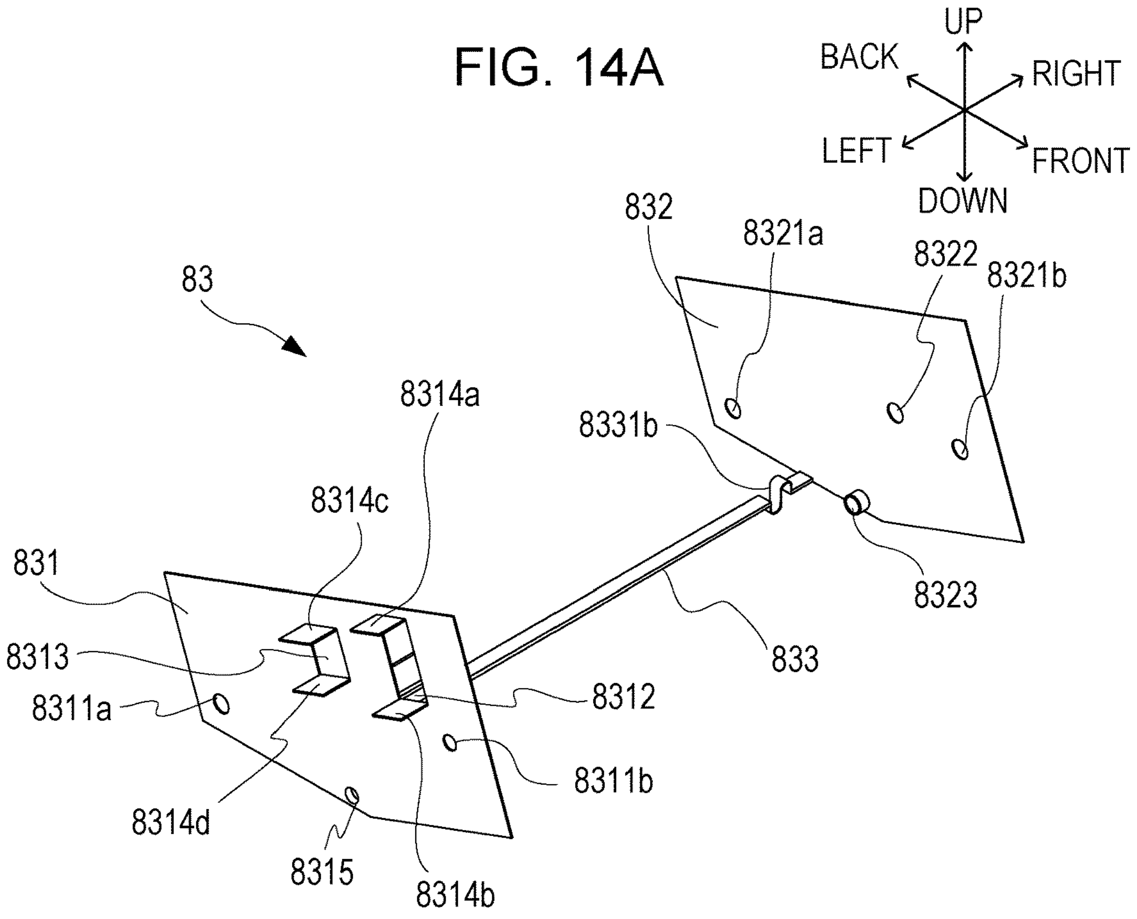
FIG. 14A is a perspective view of a protective member as viewed from the left side.
Figure 14B:
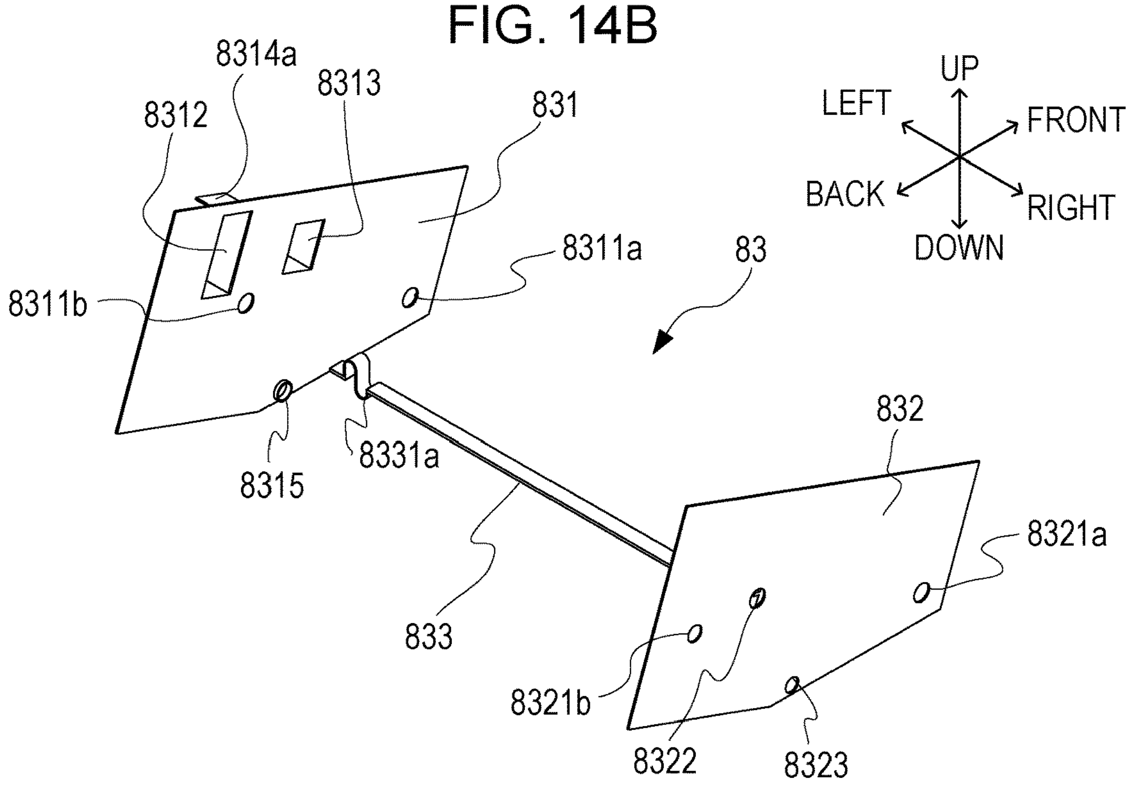
FIG. 14B is a perspective view of the protective member as viewed from the right side.
Figure 15A:
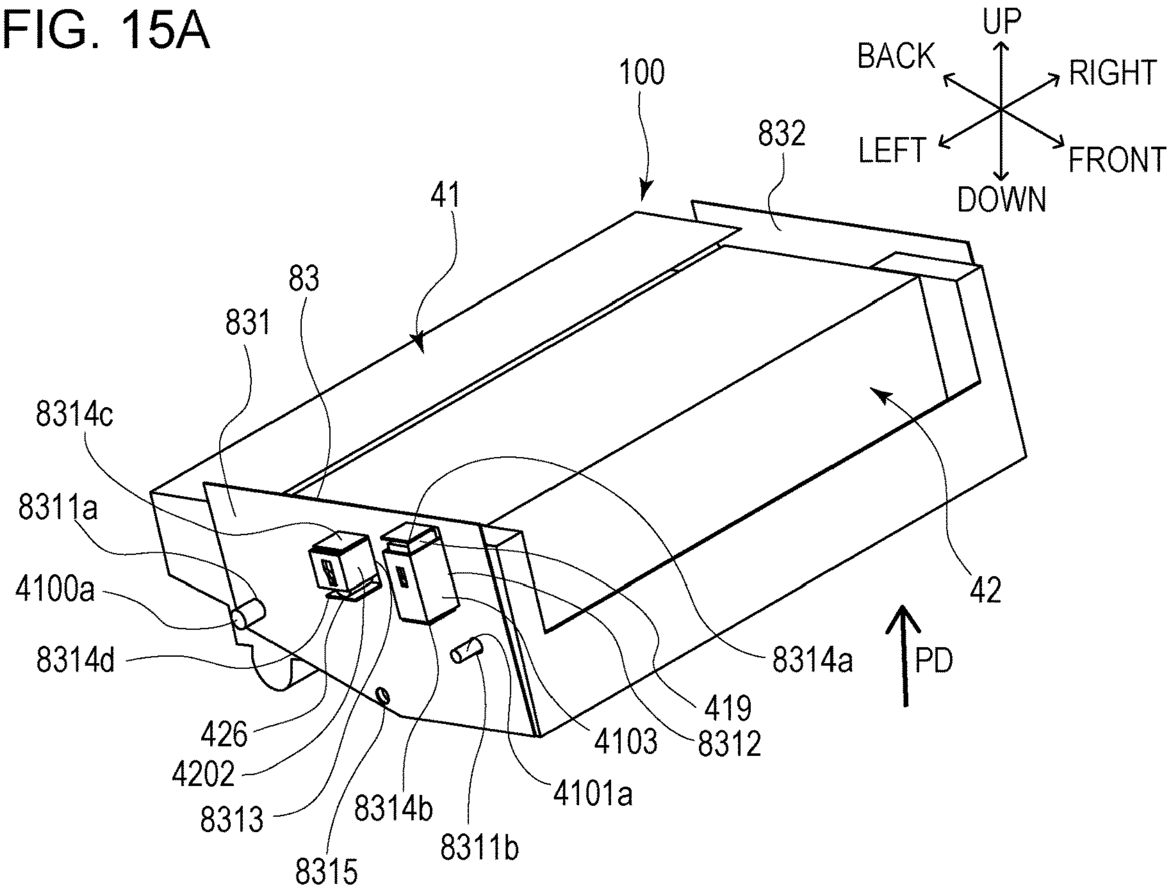
FIG. 15A is a perspective view of the protective member mounted to the process cartridge as viewed from the left side.
Figure 15B:
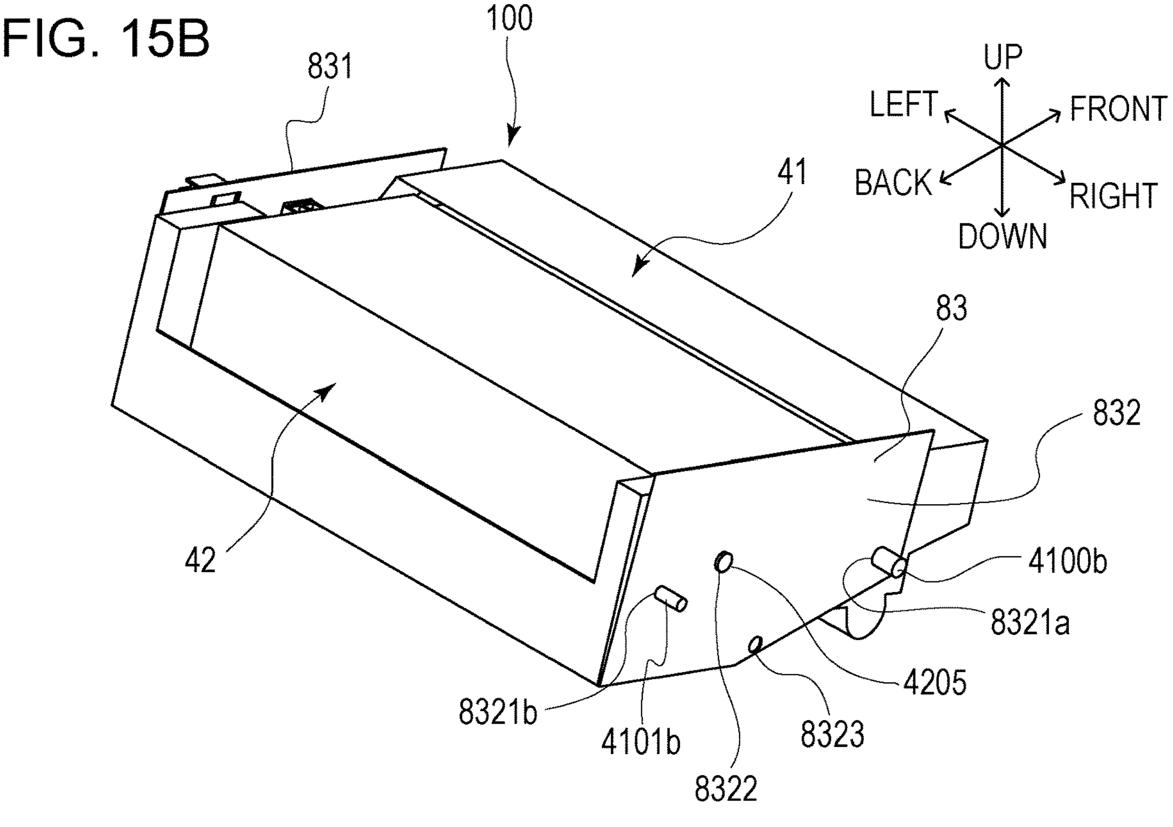
FIG. 15B is a perspective view of the protective member mounted to the process cartridge as viewed from the right side.

The protective member 83 that protects the process cartridge 100 during packing is described with reference to FIG. 5B, FIG. 7, FIGS. 14A and 14B, and FIGS. 15A and 15B. FIG. 14A is a perspective view of the protective member 83 as viewed from the left side, and FIG. 14B is a perspective view of the protective member 83 as viewed from the right side. FIG. 15A is a perspective view of the protective member 83 mounted on the process cartridge 100, as viewed from the left side, and FIG. 15B is a perspective view of the protective member 83 mounted on the process cartridge 100, as viewed from the right side.

As illustrated in FIG. 5B, the drum positioning pin 4100*b* and the drum guide pin 4101*b* are exposed on the right side surface of the process cartridge 100 formed by integrating the drum cartridge 41 with the developing cartridge 42. In addition, a shaft portion 322*b* of the driven roller 322 serving as a second conveying roller and the protective member engagement pin 4205 are exposed on the right side surface of the process cartridge 100.

As illustrated in FIG. 7, the drum positioning pin 4100*a* and the drum guide pin 4101*a* are exposed on the left side surface of the process cartridge 100 formed by integrating the drum cartridge 41 with the developing cartridge 42. A shaft portion 322*a* of the driven roller 322, the drum memory housing 4103, and the developing memory housing 4202 are exposed on the left side surface of the process cartridge 100.

As illustrated in FIG. 14A, the protective member 83 is a member obtained by integrating a left surface protective portion 831, a right surface protective portion 832, and a connecting portion 833. The left surface protective portion 831 has two drum cartridge engagement portions 8311*a* and 8311*b* and a drum housing engagement portion 8312 formed therein. The left surface protective portion 831 further has a developing housing engagement portion 8313, four memory protection portions 8314*a*, 8314*b*, 8314*c*, and 8314*d*, and a conveying roller engagement portion 8315 formed therein.

As illustrated in FIG. 14B, the right surface protective portion 832 has two drum cartridge engagement portions 8321*a* and 8321*b*, a developing cartridge engagement portion 8322, and a conveying roller engagement portion 8323 formed therein. As illustrated in FIGS. 14A and 14B, the connecting portion 833 connects the left surface protective portion 831 with the right surface protective portion 832. The connecting portion 833 includes two elastic portions 8331*a* and 8331*b*.

As illustrated in FIGS. 15A and 15B, the protective member 83 is removably supported by the drum cartridge 41 and the developing cartridge 42 of the process cartridge 100. When assembling the protective member 83 to the process cartridge 100, an operator (a packer) pulls the left surface protective portion 831 to the left and the right surface protective portion 832 of the protective member 83 to the right. Thus, the elastic portions 8331*a* and 8331*b* stretch in the right-left direction, so that the left surface protective portion 831 and the right surface protective portion 832 can be assembled from the outer sides of both side surfaces of the process cartridge 100.

The drum cartridge engagement portions 8311*a* and 8311*b* formed on the left surface protective portion 831 engage with the drum positioning pin 4100*a* and drum guide pin 4101*a* on the left side surface of the process cartridge 100, respectively. The drum memory housing 4103, the developing memory housing 4202, and the shaft portion 322*a* of the driven roller 322 on the left side surface of the process cartridge 100 engage with the drum housing engagement portion 8312, the developing housing engagement portion 8313, and the conveying roller engagement portion 8315 formed in the left surface protective portion 831, respectively.

The drum positioning pin 4100*b*, the drum guide pin 4101*b*, the protective member engagement pin 4205, and shaft portion 322*b* of driven roller 322 on the right side surface of the process cartridge 100 engage with the drum cartridge engagement portions 8321*a* and 8321*b*, the developing cartridge engagement portion 8322, and conveying roller engagement portion 8323 formed on the right surface protective portion 832, respectively.

As described above, when the protective member 83 is assembled to the process cartridge 100, the memory protection portions 8314*a* and 8314*b* serving as a first memory engagement portion protect the upper and lower portions of the drum memory unit 419. The memory protection portions 8314*c* and 8314*d* serving as a second memory engagement portion protect the upper and lower portions of the developing memory unit 426.

As described above, the left surface protective portion 831 of the protective member 83 engages with a subset of the parts constituting the drum cartridge 41, that is, the drum positioning pin 4100*a*, the drum guide pin 4101*a*, the drum memory housing 4103, and the shaft portion 322*a* of the driven roller 322. The left surface protective portion 831 of the protective member 83 engages with a subset of the parts constituting the developing cartridge 42, that is, the developing memory housing 4202.

Similarly, the right surface protective portion 832 of the protective member 83 engages with a subset of the parts constituting the drum cartridge 41, that is, the drum positioning pin 4100*b*, the drum guide pin 4101*b*, and the shaft portion 322*b* of the driven roller 322. The right surface protective portion 832 of the protective member 83 engages with a subset of the parts constituting the developing cartridge 42, that is, the protective member engagement pin 4205.

The drum positioning pins 4100*a* and 4100*b*, the drum guide pins 4101*a* and 4101*b*, the drum memory housing 4103, and the shaft portions 322*a* and 322*b* of the driven roller 322 provided on the drum cartridge 41 constitute a first engaged portion. The developing memory housing 4202 and the protective member engagement pin 4205 provided on the developing cartridge 42 constitute a second engaged portion. Part of the protective member 83 that engages with the first engaged portion constitutes a first engaging portion, and part of the protective member 83 that engages with the second engaged portion constitutes a second engaging portion.

Thus, the relative positional relationship between the drum cartridge 41 and the developing cartridge 42 can be fixed when the protective member 83 is assembled. That is, the protective member 83 determines the position of the developing cartridge 42 relative to the drum cartridge 41. Then, the drum cartridge 41 and the developing cartridge 42 having the protective member 83 assembled thereto can be packed in a cartridge inside packing manner, as illustrated in FIG. 13B.

Therefore, even if, for example, the drum cartridge 41 and the developing cartridge 42 are subjected to vibration or shock during transport of the image forming apparatus 10, the damage to the drum cartridge 41 and the developing cartridge 42 can be reduced.

Protection of Drum Memory Unit and Developing Memory Unit

Figure 16:
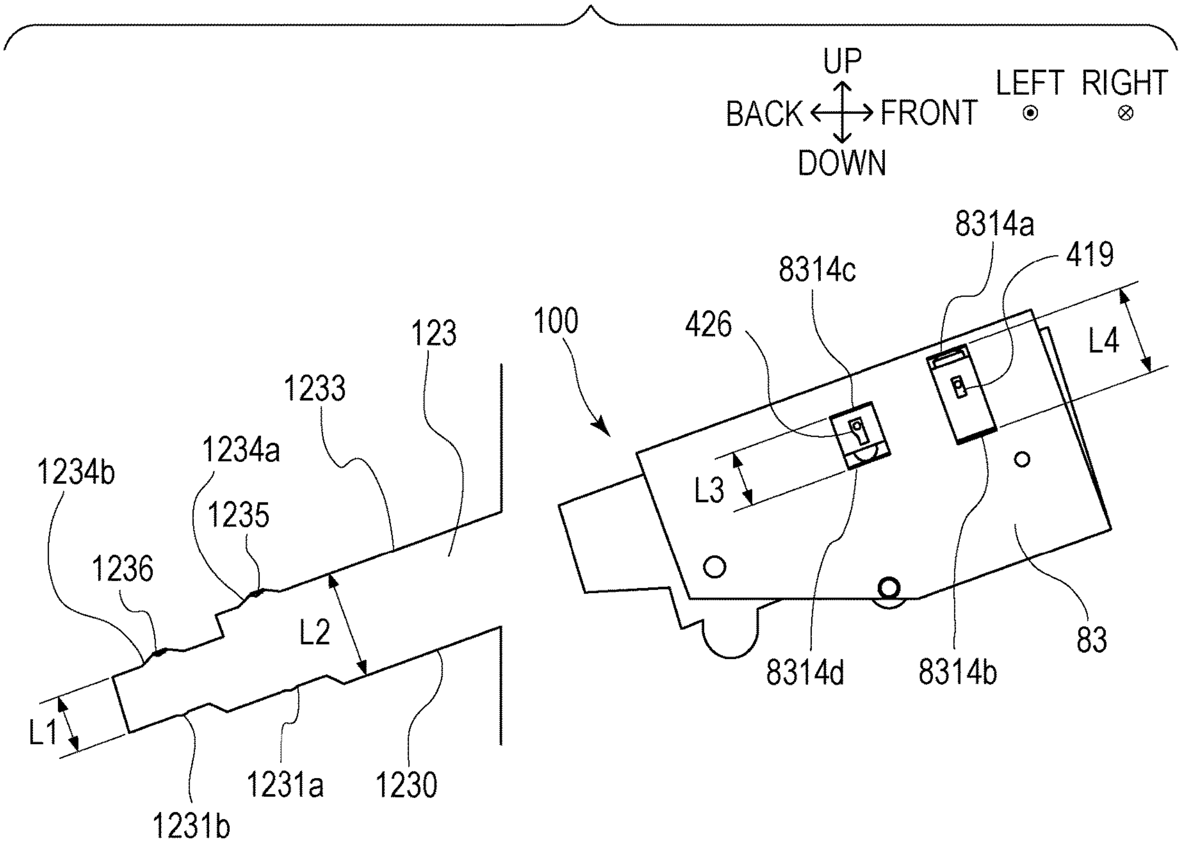
FIG. 16 is a schematic illustration of the process cartridge that has the protective member mounted thereto and that is removed from the apparatus main body.
Figure 17:
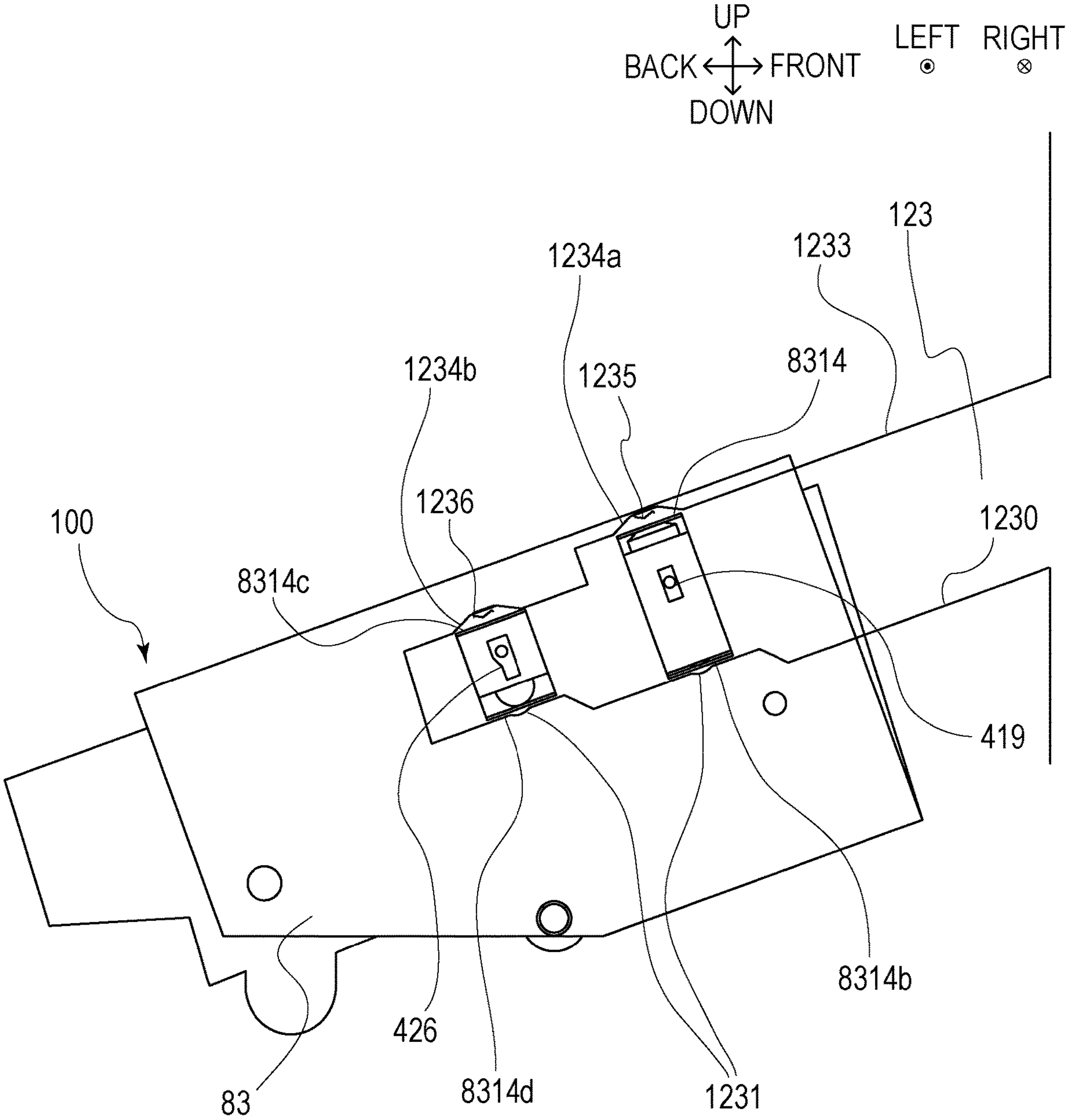
FIG. 17 is a schematic illustration of the process cartridge that has the protective member mounted thereto and that is mounted to the apparatus main body.

The protection of the drum memory unit 419 and the developing memory unit 426 is described below with reference to FIGS. 15A, 15B, 16, and 17. FIG. 16 is a schematic illustration of the process cartridge 100 that has the protective member 83 assembled thereon and that is dismounted from the apparatus main body 1. FIG. 17 is a schematic illustration of the process cartridge 100 that has the protective member 83 assembled thereon and that is mounted in the apparatus main body 1.

As illustrated in FIG. 15A, the upper and lower portions of the drum memory unit 419 are engaged with memory protection portions 8314*a* and 8314*b*, respectively, and the upper and lower portions of the developing memory unit 426 are engaged with memory protection portions 8314*c* and 8314*d*, respectively. As described above, the drum memory unit 419 and the developing memory unit 426 are extendable in a direction parallel to the pressing direction PD. The upper and lower portions of the drum memory unit 419 are pressed by the memory protection portions 8314*a* and 8314*b*, respectively, and the drum memory unit 419 is contracted in the pressing direction PD, as compared with the case where the protective member 83 is not assembled to the process cartridge 100. Similarly, the upper and lower portions of the developing memory unit 426 are pressed by the memory protection portions 8314*c* and 8314*d*, respectively, and the developing memory unit 426 is contracted in the pressing direction PD, as compared with the case where the protective member 83 is not assembled to the process cartridge 100.

As illustrated in FIG. 16, let L1 be the distance between the extended-portion contact surface 1230 and the holder contact surface 1233 at a position on the back side of the developing memory electrode 1236. Let L2 be the distance between the extended-portion contact surface 1230 and the holder contact surface 1233 at a position on the front side of the drum memory electrode 1235. Let L3 be the distance between the memory protection portions 8314*c* and 8314*d* that engage with the developing memory unit 426. Let L4 be the distance between the memory protection portions 8314*a* and 8314*b* that engage with the drum memory unit 419. Then, according to the present embodiment, setting is made such that L1>L3, and L2>L4.

As illustrated in FIG. 17, the process cartridge 100 can be mounted on the apparatus main body 1 with the protective member 83 assembled. When the process cartridge 100 with the protective member 83 assembled is mounted on the apparatus main body 1, a gap is formed between the memory guide groove 123 and each of the memory protection portions 8314*a*, 8314*b*, 8314*c*, and 8314*d*. For this reason, the process cartridge 100 can be smoothly mounted and dismounted to and from the apparatus main body 1 without interference of the memory protection portions 8314*a*, 8314*b*, 8314*c*, and 8314*d* with the memory guide groove 123.

As described above, when the protective member 83 is assembled to the process cartridge 100, the drum memory unit 419 and the developing memory unit 426 are contracted by the memory protection portions 8314*a*, 8314*b*, 8314*c*, and 8314*d*. Therefore, in the case of cartridge inside packing, the drum memory contact 4191 of the drum memory unit 419 is separated from the drum memory electrode 1235 provided on the holder contact surface 1233. The developing memory contact 4261 of the developing memory unit 426 is also separated from the developing memory electrode 1236 provided on the holder contact surface 1233.

As a result, if the process cartridge 100 formed by integrating the drum cartridge 41 with the developing cartridge 42 assembled is shipped with the protective member 83 assembled thereto, damage to the drum memory unit 419, the developing memory unit 426, the drum memory electrode 1235, and the developing memory electrode 1236 can be reduced during transport even if the process cartridge 100 is subjected to vibration or shock.

As described above, by assembling the protective member 83 to the drum cartridge 41 and the developing cartridge 42 and packing the drum cartridge 41 and the developing cartridge 42, the relative positional relationship between the drum cartridge 41 and the developing cartridge 42 can be fixed, and damage to the drum cartridge 41 and the developing cartridge 42 caused by vibration and shock during transport can be reduced. For example, sliding between the photosensitive drum 411 and the development roller 421 caused by vibration and shock during transport can be prevented, and damage to the photosensitive drum 411 and the development roller 421 can be reduced.

When the drum cartridge 41 and the developing cartridge 42 having the protective member 83 assembled thereto are packed inside the apparatus main body 1, the drum memory unit 419 and the developing memory unit 426 are separated from the drum memory electrode 1235 and the developing memory electrode 1236, respectively. For this reason, damage to the drum memory unit 419, the developing memory unit 426, the drum memory electrode 1235, and the developing memory electrode 1236 can be reduced.

Furthermore, by packing the process cartridge 100 inside the apparatus main body 1 in a "cartridge inside packing" manner, the volume of the packing box 81 can be reduced and, thus, transport efficiency can be improved.

Modification of First Embodiment

Figure 18:
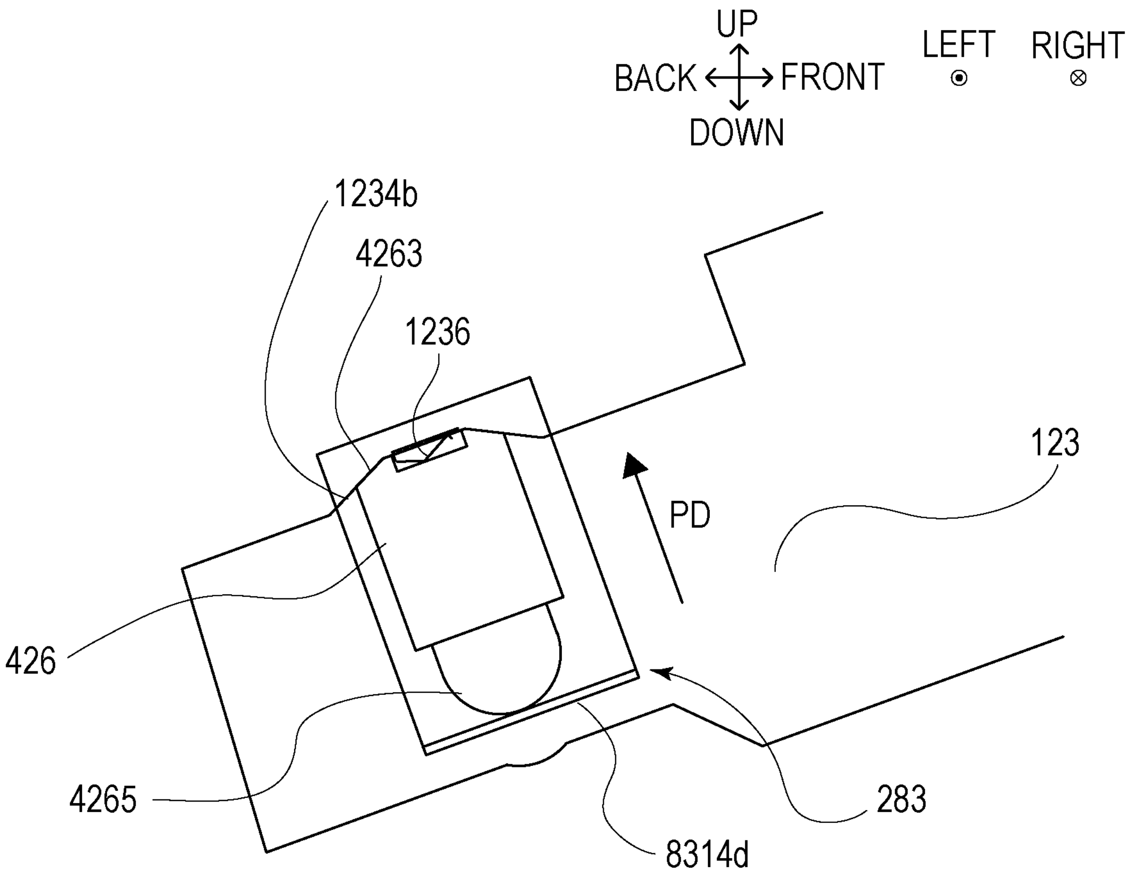
FIG. 18 is a schematic illustration of a memory protection portion of the protective member according to a modification of the first embodiment.

The modification of the first embodiment is described below with reference to FIG. 18. According to the present modification, the memory protection portion of the protective member 83 according to the first embodiment is partially modified. For this reason, the same configuration as in the first embodiment is described without illustration or by using the same reference numeral. FIG. 18 is a schematic illustration of a memory protection portion 8314*d* of a protective member 283 according to the present modification.

The protective member 283 is formed by removing the memory protection portions 8314*a* and 8314*c* from the protective member according to the first embodiment. The operations performed by the memory protection portion 8314*d* and the developing memory unit 426 are described below. However, since the operation performed by the memory protection portion 8314*b* is similar to the operation performed by the drum memory unit 419, description is omitted as appropriate.

As illustrated in FIG. 18, when the protective member 283 is assembled to the process cartridge 100, the memory protection portion 8314*d* pushes the developing memory extended portion 4265 of the developing memory unit 426 upward in the pressing direction PD. That is, when the process cartridge 100 having the protective member 283 assembled thereto is packed in the apparatus main body 1 in a “cartridge inside packing” manner, the memory protection portion 8314*d* serving as a second pressure portion presses the developing memory extended portion 4265 toward the developing memory holder 4262 against the urging force of the developing memory spring 4267. That is, the memory protection portion 8314*d* presses the developing memory extended portion 4265 toward the developing memory holder 4262 against the elastic force of the developing memory spring 4267, thus pressing the tapered surface 4263 of the developing memory holder 4262 against the tapered surface 1234*b*.

As a result, the tapered surface 4263 of the developing memory holder 4262 is pressed against the tapered surface 1234*b* of the memory guide groove 123 more strongly than when the image forming apparatus 10 forms an image, that is, when the process cartridge 100 with the protective member 283 removed is mounted in the apparatus main body 1.

Similarly, when the protective member 283 is assembled to the process cartridge 100, the memory protection portion 8314*b* pushes the drum memory extended portion 4195 of the drum memory unit 419 upward in the pressing direction PD. That is, when the process cartridge 100 with the protective member 283 assembled thereto is packed in the apparatus main body 1 in a “cartridge inside packing” manner, the memory protection portion 8314*b* serving as a first pressure portion presses the drum memory extended portion 4195 toward the drum memory holder 4192 against the urging force of the drum memory spring 4197. That is, the memory protection portion 8314*b* presses the drum memory extended portion 4195 toward the drum memory holder 4192 against the elastic force of the drum memory spring 4197, thus pressing the tapered surface 4193 of the drum memory holder 4192 against the tapered surface 1234*a*.

As a result, the tapered surface 4193 of the drum memory holder 4192 is pressed against the tapered surface 1234*a* of the memory guide groove 123 more strongly than when the image forming apparatus 10 forms an image, that is, when the process cartridge 100 with the protective member 283 removed is mounted in the apparatus main body 1.

As described above, according to the present modification, the drum memory holder 4192 and the developing memory holder 4262 are strongly pressed against the tapered surfaces 1234*a* and 1234*b* of the memory guide groove 123, so that the positioning of the drum memory unit 419 and the developing memory unit 426 is more firmly accomplished. This allows the drum memory holder 4192 and the developing memory holder 4262 to maintain contact with the tapered surfaces 1234*a* and 1234*b*, respectively, even when the drum memory holder 4192 and the developing memory holder 4262 are subjected to vibration or shock during transport. As a result, position variation of the drum memory unit 419 and the developing memory unit 426 relative to the drum memory electrode 1235 and the developing memory electrode 1236, respectively, can be reduced and, thus, damage to the drum memory electrode 1235 and the developing memory electrode 1236 can be reduced.

As described above, the drum memory unit 419 and the developing memory unit 426 are floating supported. Therefore, even if the positions of the drum memory unit 419 and the developing memory unit 426 vary due to vibration or shock, the drum memory unit 419 and the developing memory unit 426 can maintain contact with the tapered surfaces 1234*a* and 1234*b*, respectively.

Second Embodiment

The second embodiment of the present disclosure is described below. The second embodiment is an embodiment in which a developing separation engagement portion 8332 is added to the protective member 83 according to the first embodiment. For this reason, the same configuration as in the first embodiment is described without illustration or by using the same reference numeral.

Protective Member

Figure 19A:
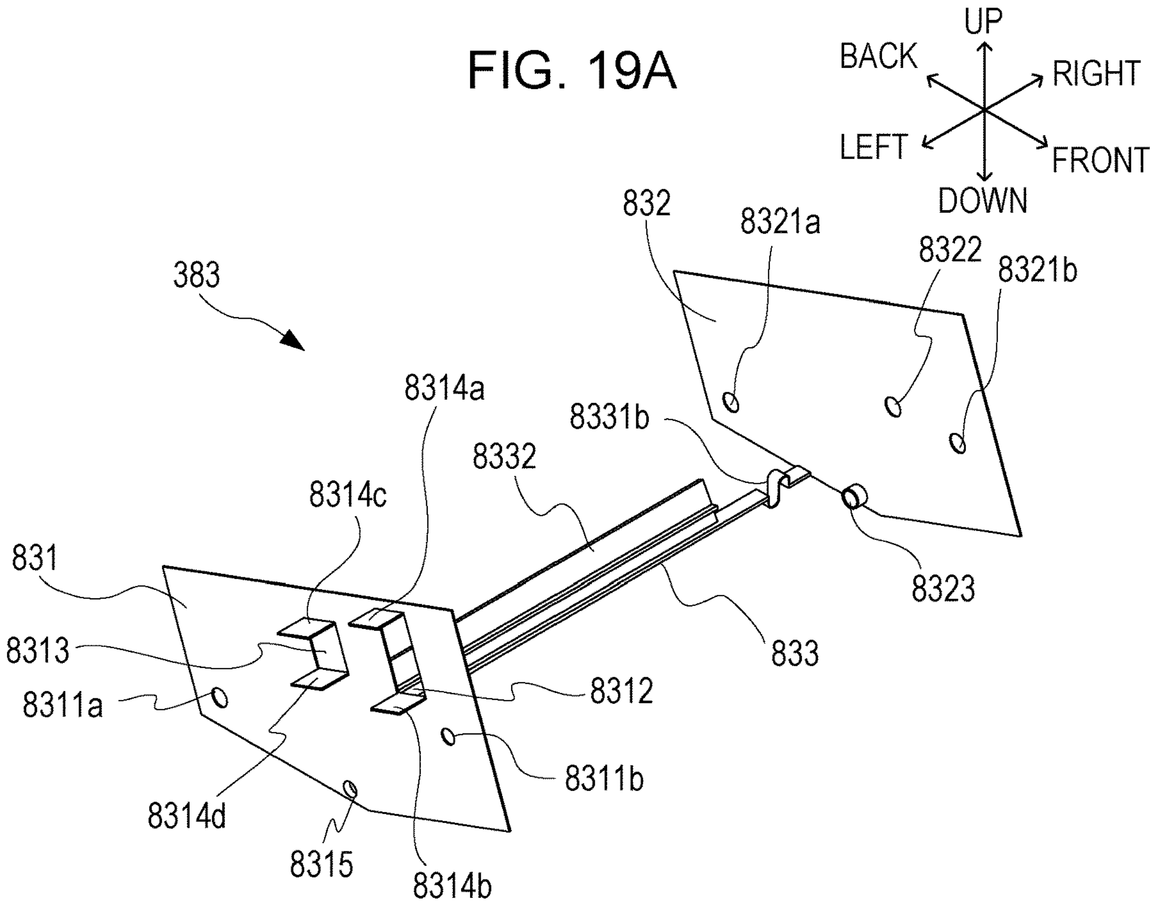
FIG. 19A is a perspective view of a protective member according to a second embodiment, as viewed from the left side.
Figure 19B:
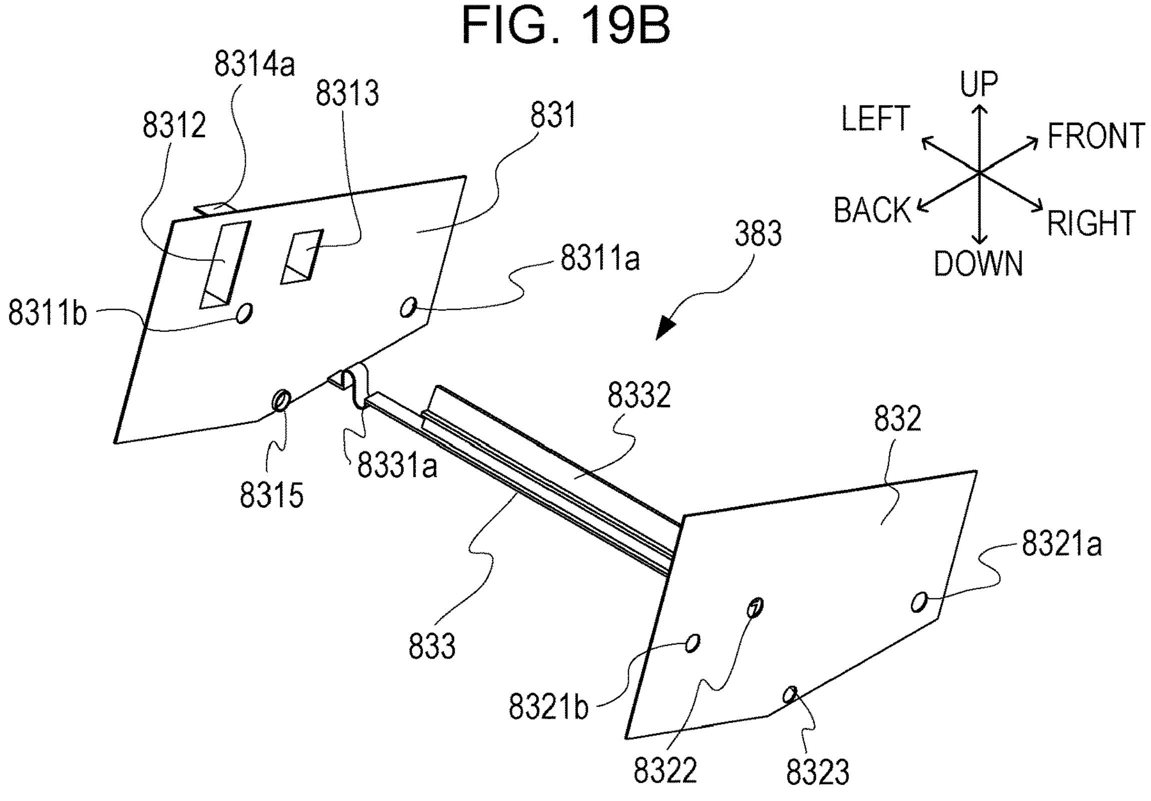
FIG. 19B is a perspective view of the protective member as viewed from the right side.

FIG. 19A is a perspective view of a protective member 383 as viewed from the left side according to the second embodiment, and FIG. 19B is a perspective view of the protective member 383 as viewed from the right side. As illustrated in FIGS. 19A and 19B, the protective member 383 according to the present embodiment includes the developing separation engagement portion 8332 in the connecting portion 833. The developing separation engagement portion 8332 extends upward from the connecting portion 833 and also extends in a right-left direction.

Developing Separation

Figure 20A:
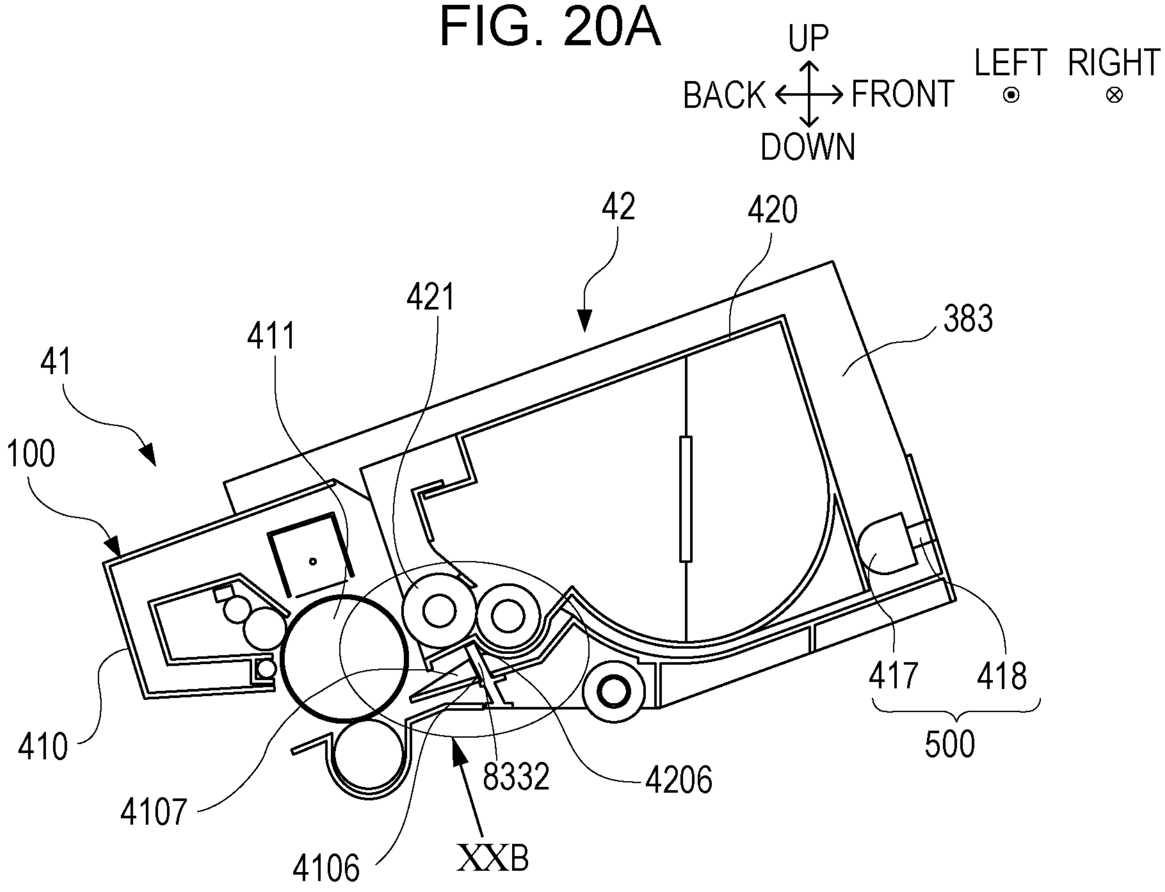
FIG. 20A is a cross-sectional view of the drum cartridge and the developing cartridge with the protective member assembled.
Figure 20B:
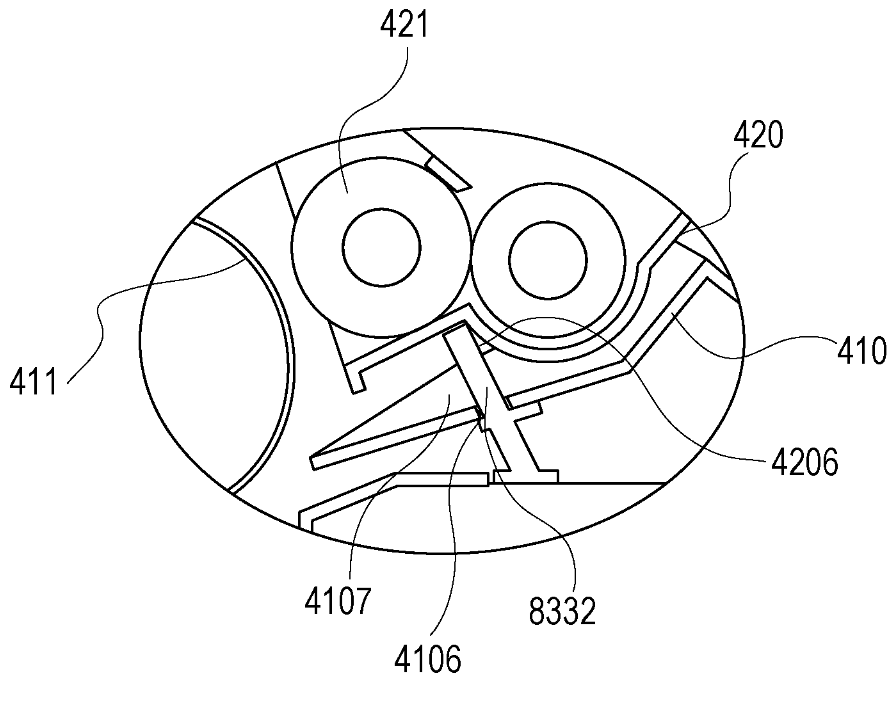
FIG. 20B is an enlarged view of a circled area XXB in FIG. 20A.

FIG. 20A is a cross-sectional view of the drum cartridge 41 and the developing cartridge 42 having the protective member 383 assembled thereto, and FIG. 20B is an enlarged view of a circled area XXB illustrated in FIG. 20A.

As illustrated in FIG. 2, when the image forming apparatus 10 performs an image forming operation, the developing cartridge 42 is pressed by the urging unit 500, so that the development roller 421 is in contact with the photosensitive drum 411 at a predetermined pressure. At this time, if the image forming apparatus 10 is subjected to vibration or shock during transport, the photosensitive drum 411 and the development roller 421 may slide against each other, possibly causing damage.

According to the present embodiment, like the first embodiment, the relative positional relationship between the drum cartridge 41 and the developing cartridge 42 is fixed by the protective member 383. According to the present embodiment, as illustrated in FIGS. 20A and 20B, the relative positional relationship between the drum cartridge 41 and the developing cartridge 42 is fixed with the development roller 421 separated from the photosensitive drum 411. This reduces the probability of damage to the photosensitive drum 411 and the development roller 421 during transport. Hereinafter, this separation of the photosensitive drum 411 and the development roller 421 from each other is referred to as “developing separation”.

Developing Separation Using Protective Member

Figure 21A:
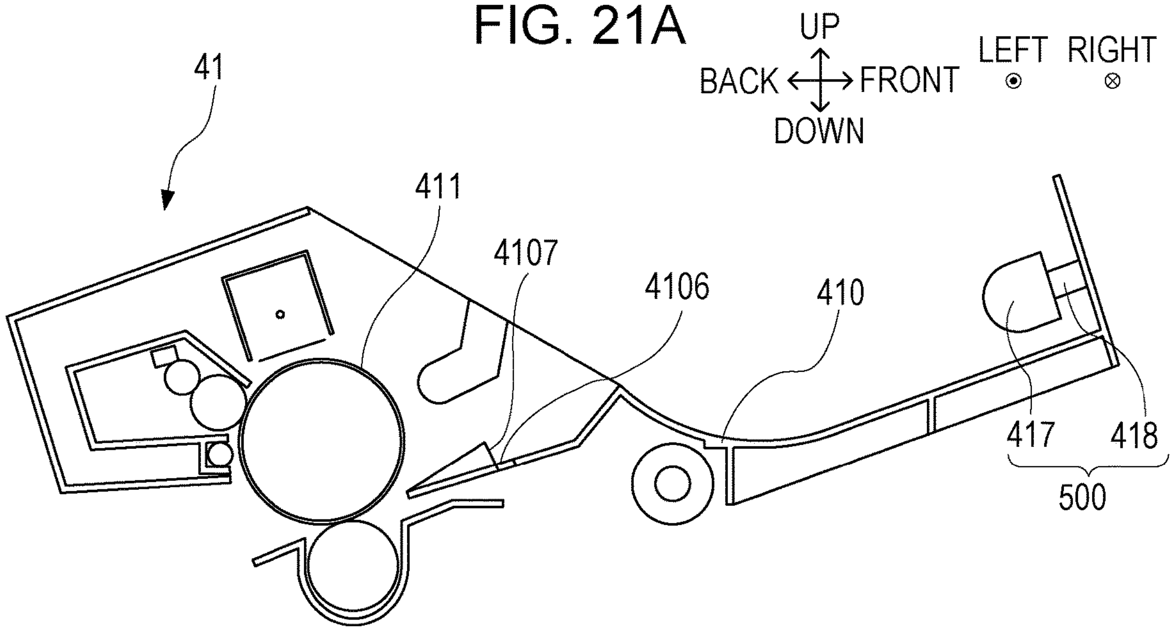
FIG. 21A is a cross-sectional view of a drum cartridge according to the second embodiment.
Figure 21B:
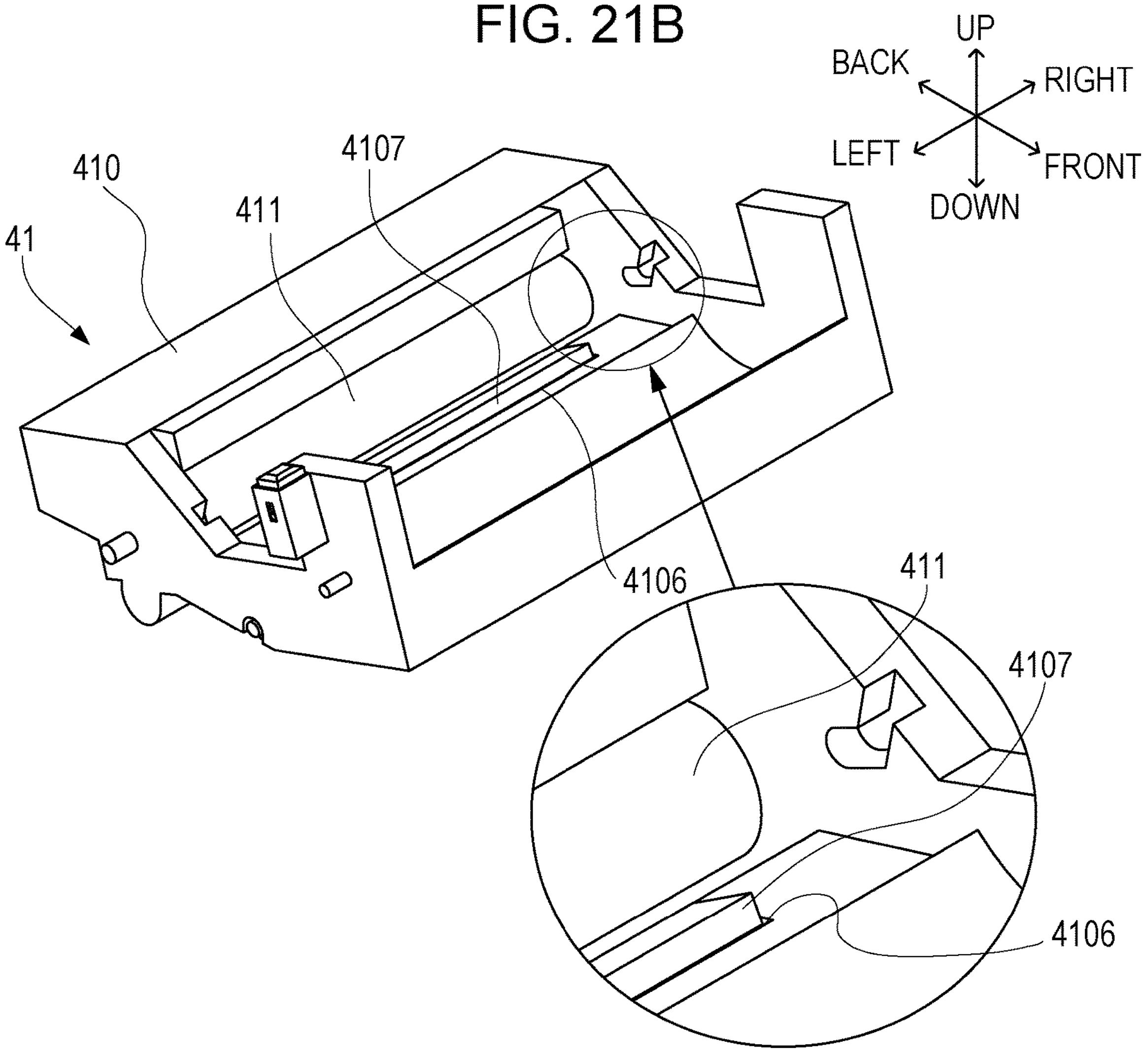
FIG. 21B is a perspective view and an enlarged perspective view of the drum cartridge.
Figure 22A:
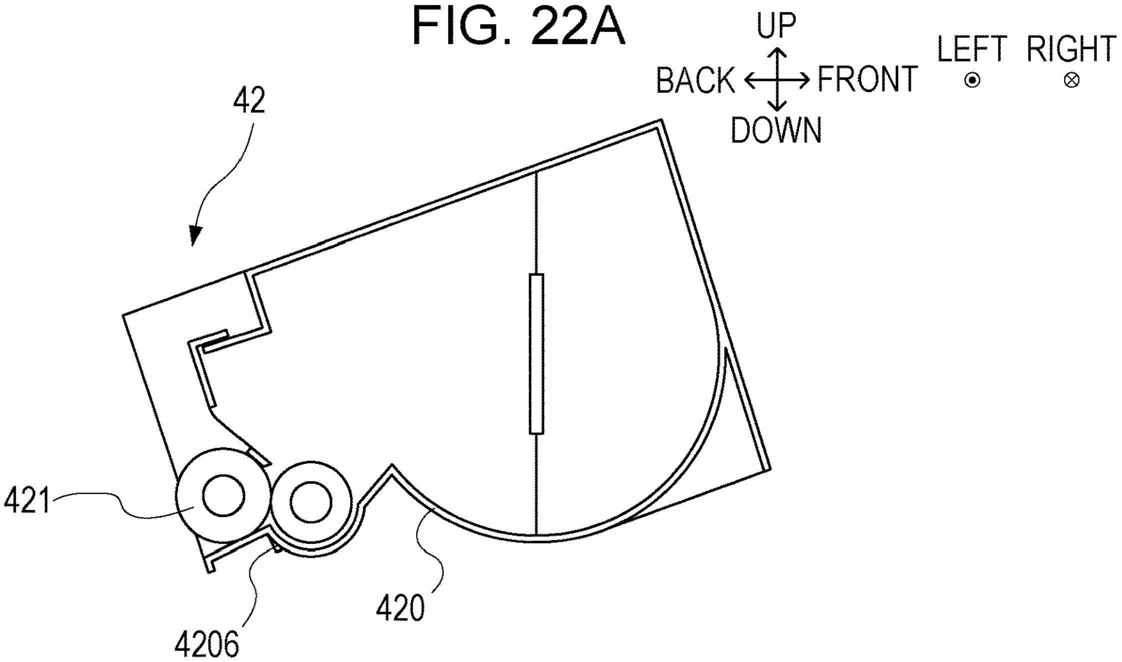
FIG. 22A is a cross-sectional view of a developing cartridge according to the second embodiment.

The developing separation using the protective member 383 is described below with reference to FIGS. 19A to 23B. FIG. 21A is a cross-sectional view of a drum cartridge 41 according to the second embodiment, and FIG. 21B is a perspective view and an enlarged perspective view of the drum cartridge 41. In FIG. 21B, the circled area in the perspective view is enlarged and illustrated in the lower right corner. FIG. 22A is a cross-sectional view of the developing cartridge 42 according to the second embodiment, and FIG.

Figure 22B:
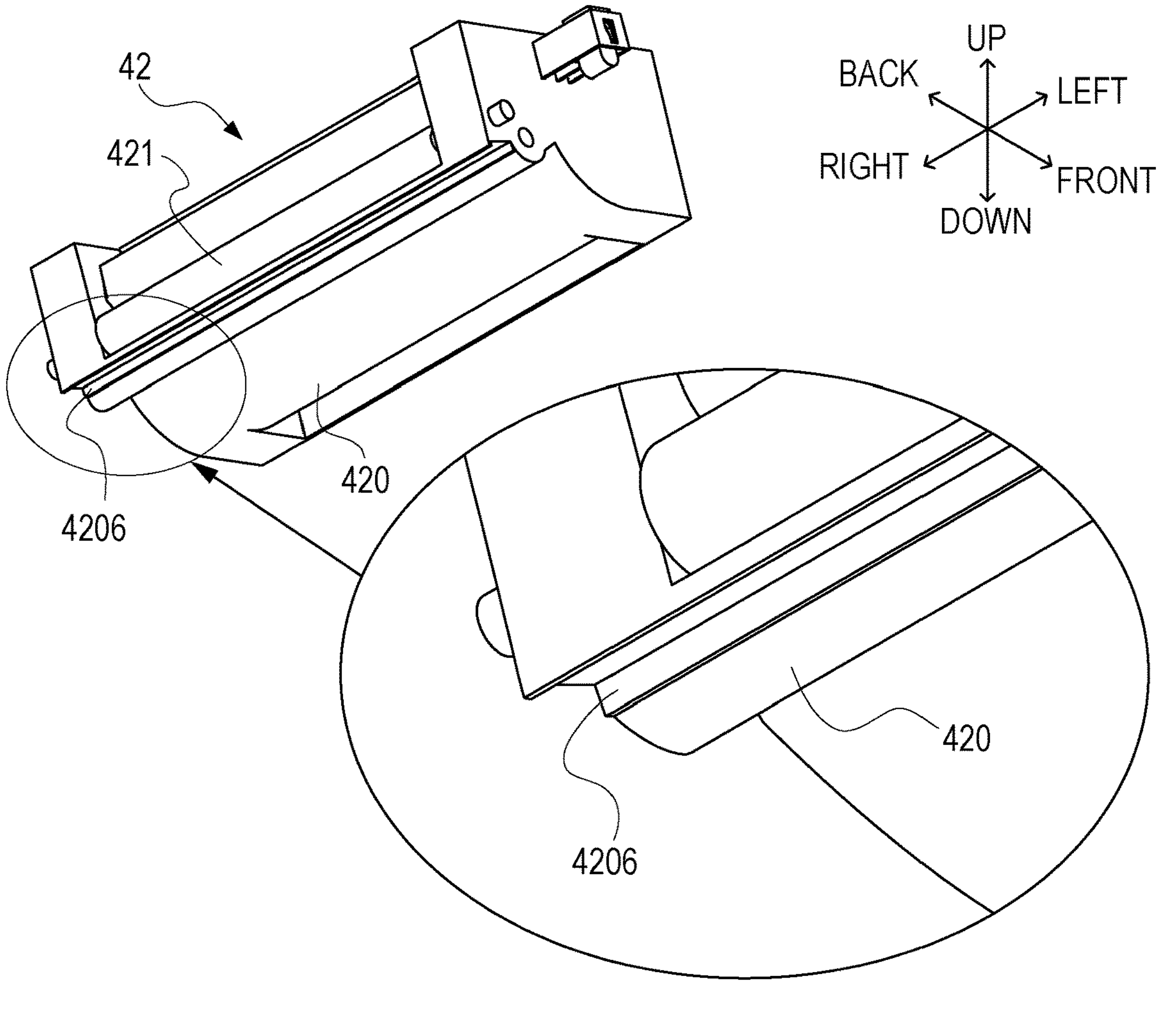
FIG. 22B is a perspective view and an enlarged perspective view of the developing cartridge.
Figure 23A:
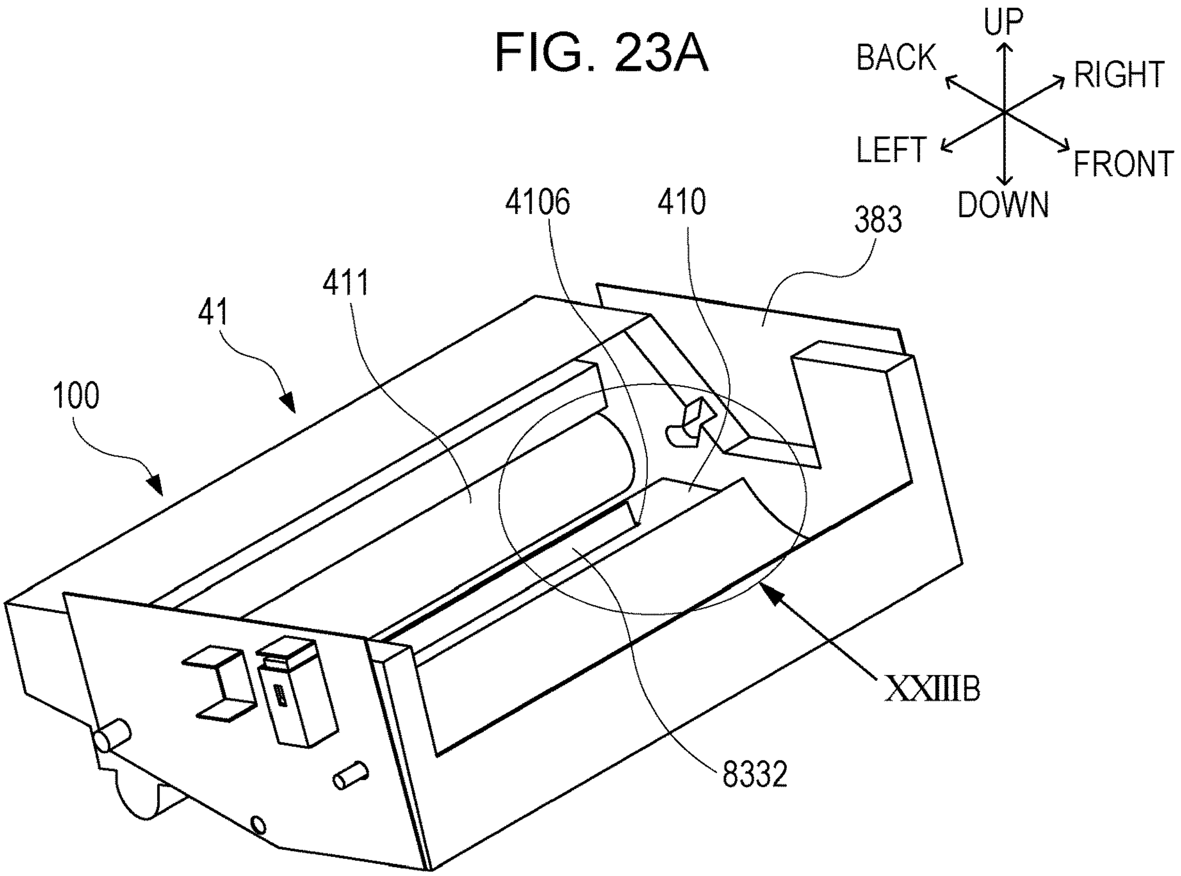
FIG. 23A is a cross-sectional view of a process cartridge having a protective member assembled thereto.
Figure 23B:
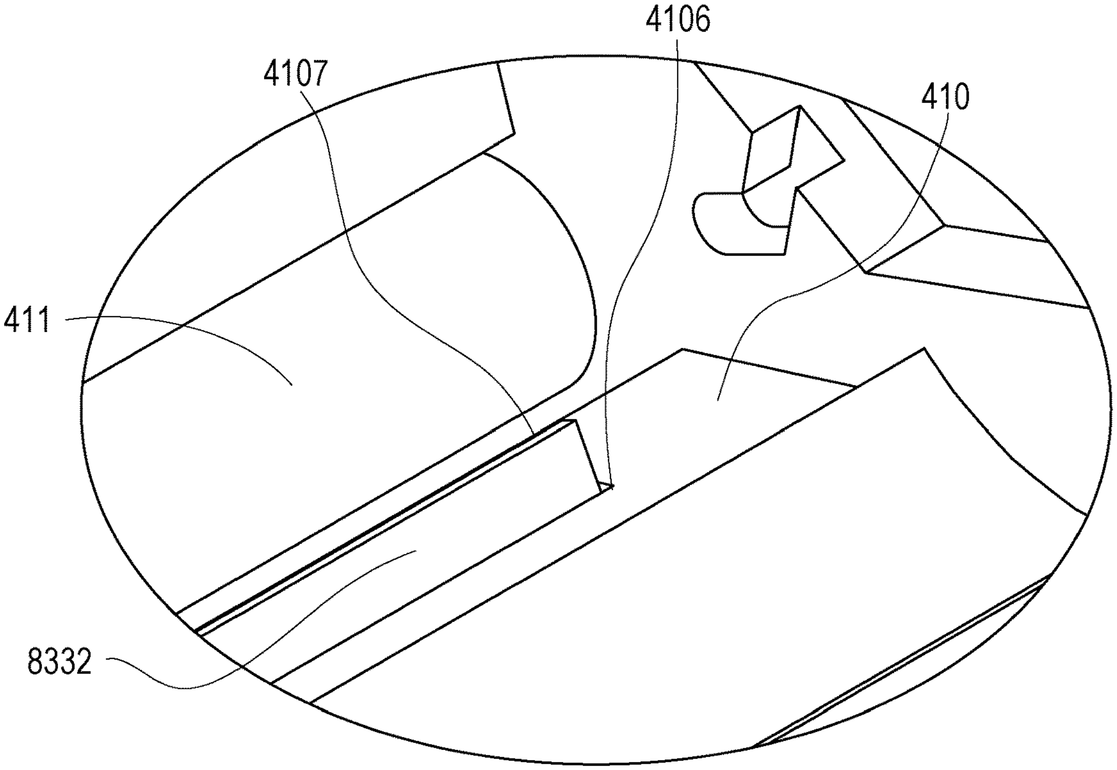
FIG. 23B is an enlarged perspective view of a developing separation engagement portion.

22B is a perspective view and an enlarged view of the developing cartridge 42. In FIG. 22B, the circled area in the perspective view is enlarged and illustrated in the lower right corner. FIG. 23A is a cross-sectional view of the process cartridge 100 having the protective member 383 assembled thereto, and FIG. 23B is an enlarged view of the developing separation engagement portion 8332.

According to the present embodiment, the positions of the drum cartridge engagement portions 8311*a* and 8311*b* and the position of the developing housing engagement portion 8313 provided in the left surface protective portion 831 of the protective member 383 are set so as to achieve "developing separation". Similarly, the positions of the drum cartridge engagement portions 8321*a* and 8321*b* of the right surface protective portion 832 and the developing cartridge engagement portion 8322 are set so as to achieve "developing separation". According to the setting, when the protective member 383 engages with the drum cartridge 41 and the developing cartridge 42, the photosensitive drum 411 and the development roller 421 are separated from each other.

As illustrated in FIG. 21A, the drum frame 410 has a developing separation opening 4106 that allows the developing separation engagement portion 8332 to be inserted thereinto and a separation rib receiving portion 4107. As illustrated in FIG. 21B, the developing separation opening 4106 and the separation rib receiving portion 4107 extend in the right-left directions. The developing separation opening 4106 and the separation rib receiving portion 4107 are configured so that the lengths are less than the length of the photosensitive drum 411 in the right-left direction (in the direction of the rotational axis).

As illustrated in FIG. 22A, a separation contact surface 4206 is formed on the bottom of the developing frame 420. As illustrated in FIG. 22B, the separation contact surface 4206 is a surface formed over the entire length of the developing frame 420 in the right-left direction.

As illustrated in FIG. 23A, when the protective member 383 is assembled to the drum cartridge 41 and the developing cartridge 42, the developing separation engagement portion 8332 is inserted into the developing separation opening 4106 from below. At this time, as illustrated in FIG. 23B, the developing separation engagement portion 8332 penetrates the developing separation opening 4106 and is disposed at a position facing the photosensitive drum 411. The developing separation engagement portion 8332 is also disposed at a position facing the separation rib receiving portion 4107.

As illustrated in FIGS. 20A and 20B, the developing separation engagement portion 8332 of the protective member 383 is nipped by the separation rib receiving portion 4107 serving as a nip portion of the drum cartridge 41 and the separation contact surface 4206 of the developing cartridge 42. More precisely, the developing separation engagement portion 8332 serving as a contact portion receives, from the separation contact surface 4206, part of the force generated when the developing cartridge 42 is pressed by the urging unit 500. That is, the developing separation engagement portion 8332 is brought into contact with the separation contact surface 4206 of the developing cartridge 42, and thus, receives the urging force of the urging unit 500. The separation rib receiving portion 4107 then receives the force from the developing separation engagement portion 8332. As described above, since the force from the urging unit 500 is received by the developing separation engagement portion 8332 and the separation rib receiving portion 4107, damage to the developing separation engagement portion 8332 can be reduced even if the developing separation engagement portion 8332 is formed using a thin-walled plate.

When the protective member 383 is assembled to the process cartridge 100 and, thus, developing separation is achieved, the developing pressure spring 418 is more compressed than when the image forming apparatus 10 forms an image on a sheet S. Thus, according to the present embodiment, the relative positional relationship between the drum cartridge 41 and the developing cartridge 42 can be fixed by the left surface protective portion 831, the right surface protective portion 832, and the developing separation engagement portion 8332 so as to achieve developing separation.

According to the present embodiment, the left surface protective portion 831, the right surface protective portion 832, and the developing separation engagement portion 8332 are used to achieve developing separation. However, the present embodiment is not limited thereto. For example, depending on the size and weight of the developing cartridge 42, it is acceptable to remove the developing separation engagement portion 8332 and use only the left surface protective portion 831 and right surface protective portion 832 for the developing separation. However, by using the developing separation engagement portion 8332, the process cartridge 100 can withstand stronger shocks and vibrations.

According to the present embodiment, the positions of the drum cartridge engagement portions 8311*a* and 8311*b* and the developing housing engagement portion 8313 are set so as to achieve developing separation. However, the present embodiment is not limited thereto. For example, the positions of the drum housing engagement portions 8312 and the developing housing engagement portions 8313 may be set so as to achieve developing separation. This configuration can reduce the size and manufacturing cost of the process cartridge 100 because the drum cartridge engagement portions 8311*a* and 8311*b* can be removed.

Modification of Second Embodiment

Figure 24:
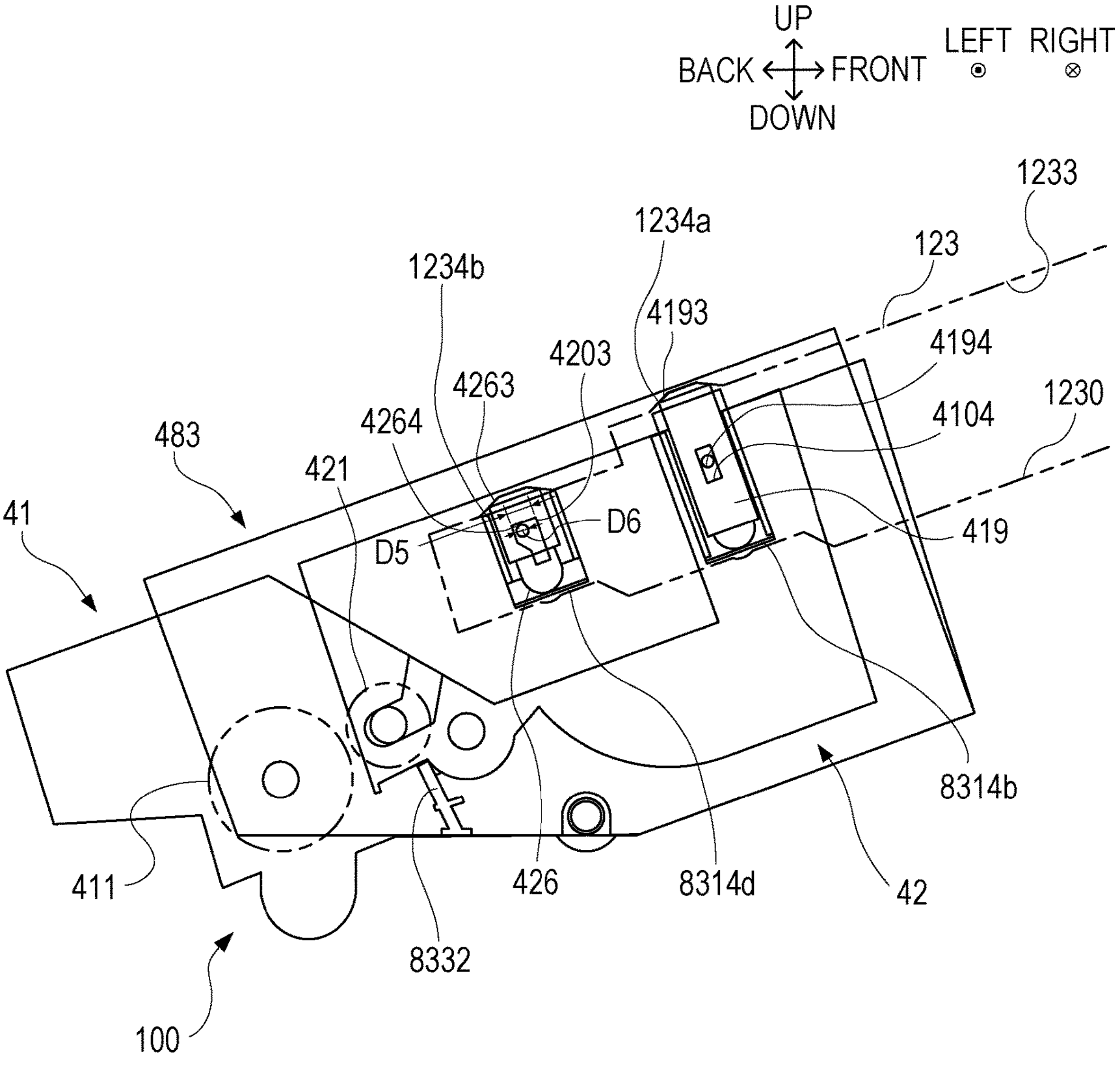
FIG. 24 is a schematic illustration of the process cartridge that has a protective member assembled thereto and that is mounted in the apparatus main body, according to a modification of the second embodiment.

The modification of the second embodiment is described below with reference to FIG. 24. Like the modification of the first embodiment, according to the present modification, the memory protection portion of the protective member 383 according to the second embodiment is partially modified. For this reason, the same configuration as in the second embodiment is described without illustration or by using the same reference numeral. FIG. 24 is a schematic illustration of the process cartridge 100 having a protective member 483 according to the present modification assembled thereto when the process cartridge 100 is mounted to the apparatus main body 1.

The protective member 483 according to the modification of the second embodiment is configured by removing the memory protection portions 8314*a* and 8314*c* of the protective member according to the second embodiment, as illustrated in FIG. 24. The operation of the configuration configured by removing the memory protection portions 8314*a* and 8314*c* of the protective member is similar to that of the modification of the first embodiment described in FIG. 18. That is, when the process cartridge 100 having the protective member 483 assembled thereto is packed in the apparatus main body 1 in the cartridge inside packing manner, the following operations are performed. That is, the memory protection portions 8314*b* and 8314*d* press the tapered surface 4193 of the drum memory holder 4192 and the tapered surface 4263 of the developing memory holder 4262 strongly against the tapered surfaces 1234*a* and 1234*b* of the memory guide groove 123, respectively. This allows the positioning of the drum memory unit 419 and the developing memory unit 426 to be more firmly accomplished relative to the memory guide groove 123.

At this time, to achieve developing separation under the above-described conditions, the value D5-D6 needs to be optimized. That is, for the developing memory guide hole 4203, the variation due to developing pressure, the variation of the drum cartridge 41, and the variation of the developing cartridge 42, as well as the variation due to the developing separation need to be taken into consideration. The term "developing pressure" refers to contact of the photosensitive drum 411 with the development roller 421 at a predetermined pressure.

In contrast, for the drum memory guide hole 4104, all of the above-described variations need not be taken into account. For this reason, the value D1-D2 need not be set as large as the value D5-D6, as illustrated in FIG. 9 and FIG. 24.

As described above, the simple configuration for developing separation by the protective member 483 prevents damage to the photosensitive drum 411 and the development roller 421 caused by vibration and shock during, for example, transport.

OTHER EMBODIMENTS

The embodiments and the modifications described above can be combined in any way. That is, the function of protecting the drum memory unit 419 and the developing memory unit 426 described in the first embodiment and the modification of the first embodiment may be combined with the function of the developing separation described in the second embodiment and the modification of the second embodiment.

According to any one of the embodiments described above, the drum positioning pins 4100*a* and 4100*b*, the drum guide pins 4101*a* and 4101*b*, the drum memory housing 4103, and the shaft portions 322*a* and 322*b* of the driven roller 322 provided in the drum cartridge 41 engage with the protective member 83, 283, 383, or 483. However, the configuration is not limited thereto. That is, it is only required that at least one of the drum positioning pins 4100*a* and 4100*b*, the drum guide pins 4101*a* and 4101*b*, the drum memory housing 4103, and the shaft portions 322*a* and 322*b* of the driven roller 322 provided in the drum cartridges 41 engages with the protective member 83, 283, 383, or 483.

According to any one of the embodiments described above, the developing memory housing 4202 and the protective member engagement pin 4205 provided on the developing cartridge 42 are engaged with the protective members 83, 283, 383, or 483. However, the configuration is not limited thereto. That is, it is only recommended that at least one of the developing memory housing 4202 and the protective member engagement pin 4205 engages with the protective member 83, 283, 383, or 483.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-159239 filed Sep. 22, 2023, which is hereby incorporated by reference herein in its entirety.

What is claimed is:

1. An image forming apparatus comprising:

an apparatus main body;

a first unit dismountable from the apparatus main body;

a second unit dismountable from the first unit; and a protective member dismountably supported by the first unit and the second unit, wherein the first unit includes a photosensitive member configured to bear an electrostatic latent image, a transfer unit configured to transfer a toner image formed on the photosensitive member, a first unit memory section configured to store information regarding the first unit, and a first holding unit configured to movably hold the first unit memory section, wherein the second unit includes a development roller configured to develop the electrostatic latent image borne by the photosensitive member into a toner image, a storage section configured to store a developer, a second unit memory section configured to store information regarding the second unit, and a second holding unit configured to movably hold the second unit memory section, wherein the apparatus main body includes a first main body contact that is electrically connectable to the first unit memory section and a second main body contact that is electrically connectable to the second unit memory section, wherein the first unit memory section includes a first positioned portion that is in contact with a first positioning portion of the apparatus main body so as to be positioned relative to the first positioning portion, wherein the second unit memory section includes a second positioned portion that is in contact with a second positioning portion of the apparatus main body so as to be positioned relative to the second positioning portion, wherein the protective member includes a first pressure portion configured to press the first positioned portion of the first unit memory section against the first positioning portion of the apparatus main body and a second pressure portion configured to press the second positioned portion of the second unit memory section against the second positioning portion of the apparatus main body when the image forming apparatus is packed, wherein when the first positioned portion is positioned by the first positioning portion of the apparatus main body, the first unit memory section is electrically connected to the first main body contact, and wherein when the second positioned portion is positioned by the second positioning portion of the apparatus main body, the second unit memory section is electrically connected to the second main body contact.

2. An image forming apparatus comprising:

an apparatus main body;

a first unit dismountable from the apparatus main body;

a second unit dismountable from the first unit; and a protective member dismountably supported by the first unit and the second unit, wherein the first unit includes a photosensitive member configured to bear an electrostatic latent image, a transfer unit configured to transfer a toner image formed on the photosensitive member, a first unit memory section configured to store information regarding the first unit, and a first engaged portion, wherein the second unit includes a development roller configured to develop the electrostatic latent image borne by the photosensitive member into a toner image, a storage section configured to store a developer, a second unit memory section configured to store information regarding the second unit, and a second engaged portion, wherein the apparatus main body includes a first main body contact that is electrically connectable to the first unit memory section and a second main body contact that is electrically connectable to the second unit memory section, wherein when the image forming apparatus is packed, the first unit and the second unit are mounted to the apparatus main body with the second unit mounted to the first unit and with the protective member mounted to the first unit and the second unit, wherein the protective member includes a first engaging portion configured to engage with the first engaged portion and a second engaging portion configured to engage with the second engaged portion and determines a relative position of the second unit relative to the first unit when the first engaging portion and the second engaging portion engage with the first engaged portion and the second engaged portion, respectively, wherein the apparatus main body includes a first conveying roller configured to convey a sheet, wherein the first unit includes a second conveying roller configured to nip the sheet together with the first conveying roller and convey the sheet, and wherein the first engaged portion includes a shaft portion of the second conveying roller.

3. An image forming apparatus comprising:

an apparatus main body;

a first unit dismountable from the apparatus main body;

a second unit dismountable from the first unit; and a protective member dismountably supported by the first unit and the second unit, wherein the first unit includes a photosensitive member configured to bear an electrostatic latent image, a transfer unit configured to transfer a toner image formed on the photosensitive member, a first unit memory section configured to store information regarding the first unit, and a first engaged portion, wherein the second unit includes a development roller configured to develop the electrostatic latent image borne by the photosensitive member into a toner image, a storage section configured to store a developer, a second unit memory section configured to store information regarding the second unit, and a second engaged portion, wherein the apparatus main body includes a first main body contact that is electrically connectable to the first unit memory section and a second main body contact that is electrically connectable to the second unit memory section, wherein when the image forming apparatus is packed, the first unit and the second unit are mounted to the apparatus main body with the second unit mounted to the first unit and with the protective member mounted to the first unit and the second unit, wherein the protective member includes a first engaging portion configured to engage with the first engaged portion and a second engaging portion configured to engage with the second engaged portion and determines a relative position of the second unit relative to the first unit when the first engaging portion and the second engaging portion engage with the first engaged portion and the second engaged portion, respectively, wherein the development roller is separated from the photosensitive member with the first engaging portion and the second engaging portion of the protective member engaging with the first engaged portion of the first unit and the second engaged portion of the second unit, respectively, wherein the first unit includes an urging unit configured to urge the second unit so that the development roller moves closer to the photosensitive member, and wherein the protective member includes a contact portion that is in contact with the second unit so as to receive an urging force of the urging unit.

4. The image forming apparatus according to claim 3, wherein the first unit includes a nip portion configured to nip the contact portion together with the second unit.

5. The image forming apparatus according to claim 3, wherein the urging unit includes a compression spring, and wherein when the protective member is mounted to the first unit and the second unit, the compression spring is compressed more than when the image forming apparatus is forming an image on a sheet.

* * * * *